(12) United States Patent
LaHousse et al.

(10) Patent No.: US 12,391,222 B2
(45) Date of Patent: Aug. 19, 2025

(54) HANDLE ASSEMBLY FOR TRAILER LANDING GEAR

(71) Applicant: Alkon Corporation, Fremont, OH (US)

(72) Inventors: Shane R. LaHousse, Ann Arbor, MI (US); Justin Ambrosi, Livonia, MI (US); Christopher Domanski, Brighton, MI (US)

(73) Assignee: Alkon Corporation, Fremont, OH (US)

( * ) Notice: Subject to any disclaimer, the term of this patent is extended or adjusted under 35 U.S.C. 154(b) by 0 days.

(21) Appl. No.: 18/563,096

(22) PCT Filed: May 21, 2021

(86) PCT No.: PCT/US2021/033614
§ 371 (c)(1),
(2) Date: Nov. 21, 2023

(87) PCT Pub. No.: WO2022/245367
PCT Pub. Date: Nov. 24, 2022

(65) Prior Publication Data
US 2024/0227744 A1    Jul. 11, 2024

(51) Int. Cl.
*B60S 9/02* (2006.01)
*G05G 1/08* (2006.01)

(52) U.S. Cl.
CPC .............. *B60S 9/02* (2013.01); *G05G 1/085* (2013.01)

(58) Field of Classification Search
CPC ......... G05G 1/085; B60S 9/08; A01K 89/009; B25G 1/007; Y10T 74/20756; Y10T 74/20762; Y10T 74/2075; Y10T 74/20744
See application file for complete search history.

(56) References Cited

U.S. PATENT DOCUMENTS 2,460,216 A * 1/1949 Dalton .................. F16D 3/2052
                                                  403/57
3,436,987 A * 4/1969 Baxter .................. G05G 1/085
                                                  74/547

(Continued)

FOREIGN PATENT DOCUMENTS

EP         0844208 A1       5/1998
FR         2635205 A1 *     2/1990

OTHER PUBLICATIONS

USPTO Machine Translation (retrieved from FIT database) of FR 2635205 A1, Feb. 9, 1990. (Year: 2024).*

(Continued)

*Primary Examiner* — Daniel D Yabut
(74) *Attorney, Agent, or Firm* — Bond, Schoeneck & King, PLLC

(57) ABSTRACT

A trailer landing gear system and handle assembly including a handle having an engagement bracket portion including a plurality of grooves or a plurality of notches. The handle assembly also includes a pivot bracket pivotably secured to the engagement bracket portion, the pivot bracket including a through-bore arranged to receive a shift shaft of a trailer landing gear assembly, such that the pivot bracket is arranged about the shift shaft and can maintain a constant connection with the shift shaft. The handle assembly further includes a pin secured to a proximate end of the shift shaft, the shift shaft having an imaginary rotational axis wherein the plurality of grooves or the plurality of notches are arranged to engage with the pin such that rotation of the handle about the imaginary rotational axis in a first rotational direction generates a rotational motion of the shift shaft in the first rotational direction.

12 Claims, 16 Drawing Sheets

(56) References Cited

U.S. PATENT DOCUMENTS

| | | | |
|---|---|---|---|
| 3,771,385 A | 11/1973 | Benoit et al. | |
| 5,538,225 A | 7/1996 | VanDenberg | |
| 5,904,342 A * | 5/1999 | Laarman | B60S 9/08 |
| | | | 254/419 |
| 6,099,016 A * | 8/2000 | Peveler | B60S 9/08 |
| | | | 254/419 |
| 9,393,936 B1 | 7/2016 | Grote | |
| 2003/0150291 A1* | 8/2003 | Grenier | G05G 1/04 |
| | | | 74/545 |
| 2006/0156857 A1* | 7/2006 | Turner | G05G 1/085 |
| | | | 74/545 |
| 2007/0257243 A1* | 11/2007 | Cofer | G05G 1/085 |
| | | | 254/419 |
| 2008/0164683 A1 | 7/2008 | VanDenberg | |
| 2016/0264107 A1* | 9/2016 | Riedl | B60S 9/08 |
| 2017/0001603 A1* | 1/2017 | Chen | B25B 23/0078 |

OTHER PUBLICATIONS

International Search Report and the Written Opinion of the International Searching Authority, PCT Application No. PCT/US2021/033614, pp. 1-16, dated Sep. 27, 2021.

YouTube video clip entitled "Cranking Trailer Landing Gear," uploaded on Oct. 12, 2018 by Midwestern Insurance Alliance. Retrieved from Internet: <https://www.youtube.com/watch?v=t6onRzaon4M&ab_channel=MidwesternInsuranceAlliance>.

"Correct Position of Landing Gear Crank Handle on Dropped Semi Trailers" NKBJ InfoNet, LLC, 2010, Retrieved from Internet Archive: https://web.archive.org/web/20100623145158/https://truck-drivers-money-saving-tips.com/landing-gear.html.

Landing Gear Catalog, 2018, Retrieved from the Internet: < https://www.stoughtontrailers.com/Portals/0/documents/parts/new-products-special/LANDING%20GEAR%20Mini%20Catalog.pdf?ver=2019-08-08-102513-690>.

* cited by examiner

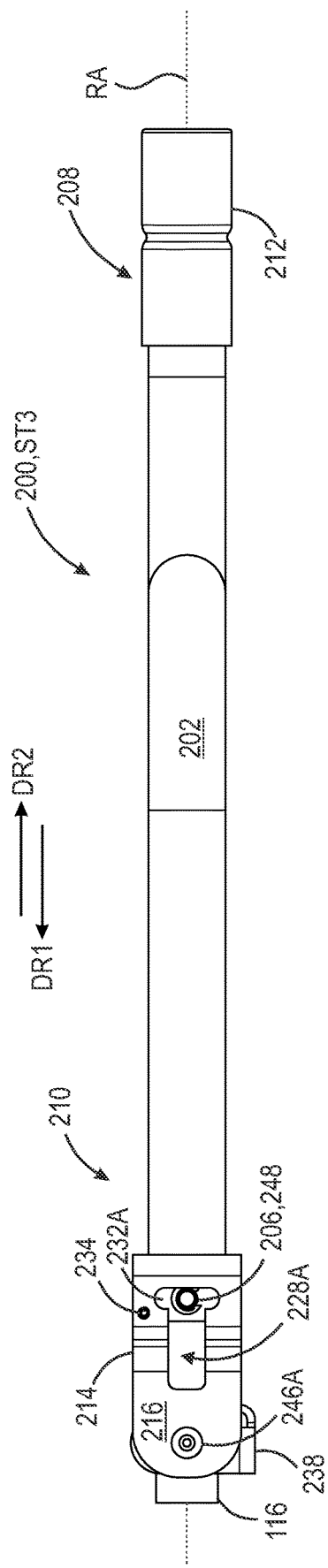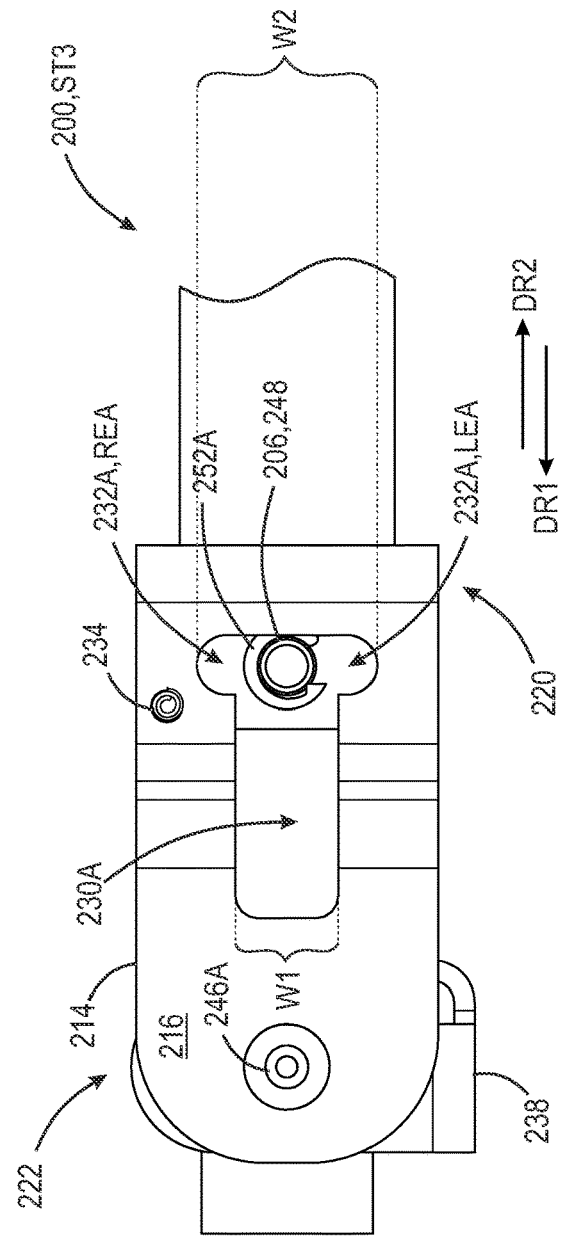
Fig. 6A
Fig. 6B

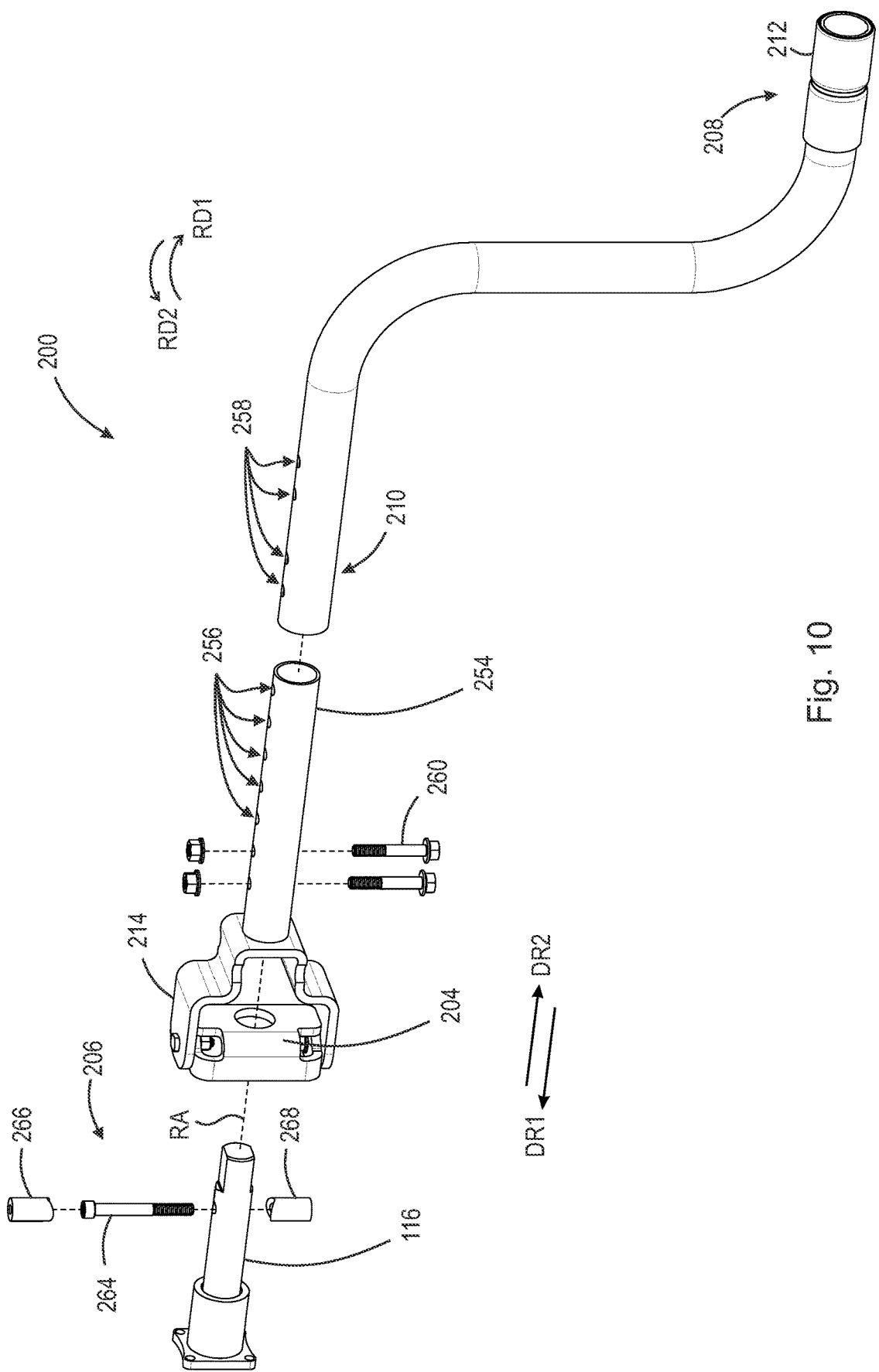

HANDLE ASSEMBLY FOR TRAILER LANDING GEAR

CROSS-REFERENCE TO RELATED APPLICATIONS

The present application is a United States National Stage Application pursuant to 35 U.S.C. § 371 of International Patent Application No. PCT/US2021/033614, filed May 21, 2021, and entitled, "Handle Assembly for Trailer Landing Gear," the entire disclosure of which is hereby incorporated by reference in its entirety.

FIELD OF THE DISCLOSURE

The present disclosure is directed generally to landing gear assemblies, specifically to handle assemblies for trailer landing gear systems.

BACKGROUND

Trailers for transporting goods are configured to be removably connectable with a tractor, which typically includes a power source, e.g., a gas-powered engine, which propels the combined tractor-trailer to its destination. The tractor and the trailer typically include a component or components for creating a releasable connection between the tractor and the trailer. A trailer can also include one or more pairs of rear wheels, where each pair of rear wheels is non-rotatably connected via an axle. Notably, the trailer may include retractable or telescoping landing gear, which can be positioned at the front of the trailer proximate the component or components which establish the releasable connection with the tractor. When a tractor-trailer is transporting goods, the axles of the tractor and the connection with the tractor keep the trailer level and stable and the landing gear is retracted. However, once the tractor-trailer reaches its destination and the operator of the tractor disconnects the tractor from the trailer, the landing gear is expanded and, while in the expanded state, is used to keep the trailer substantially level.

Generally, landing gear systems are manually operated, i.e., actuated between the retracted state and the expanded state, via a manual hand crank. Typically the manual hand crank is a separable component which is stored separately from and beneath the trailer landing gear or within the cabin of the tractor with the operator during transit.

SUMMARY OF THE DISCLOSURE

The present disclosure is related to an improved handle assembly and a trailer landing gear system with an improved handle assembly. The handle assembly includes a handle with a grip portion and an engagement bracket portion, where the engagement bracket portion includes a plurality of grooves or a plurality of notches. The handle assembly also includes a pivot bracket pivotably secured to the engagement bracket portion, the pivot bracket including a through-bore arranged to receive a shift shaft of a trailer landing gear assembly, such that the pivot bracket is arranged about the shift shaft. The handle assembly further includes a pin secured to a proximate end of the shift shaft, the shift shaft having an imaginary rotational axis wherein the plurality of grooves are arranged to engage with the pin such that rotation of the handle about the imaginary rotational axis in a first rotational direction generates a rotational motion of the shift shaft in the first rotational direction. The present trailer landing gear system and handle assembly provide a pivotable handle assembly which is continuously connected to the shift shaft of the trailer landing gear system such that the handle assembly is always located proximate the shift shaft and is ready to be pivoted into an engaged position quickly and efficiently. Additionally, the handle assembly can be pivoted away and stowed such that there is no interference between the stowed handle and the rotating shift shaft during transportation of a tractor trailer.

In one example, a handle assembly is provided, the handle assembly including a handle including a first end and a second end, the first end having a grip portion and the second end arranged proximate to an engagement bracket portion, the engagement bracket portion including a plurality of grooves or a plurality of notches, a pivot bracket pivotably secured to the engagement bracket portion, the pivot bracket including a through-bore arranged to receive a shift shaft of a trailer landing gear assembly, such that the pivot bracket is arranged about the shift shaft, and a pin secured to a proximate end of the shift shaft, the shift shaft having an imaginary rotational axis, wherein, the plurality of grooves or the plurality of notches are arranged to engage with the pin such that rotation of the handle about the imaginary rotational axis in a first rotational direction generates a rotational motion of the shift shaft in the first rotational direction.

In an aspect, in a first state, the plurality of grooves or the plurality of notches are arranged to engage with the pin such that rotation of the handle about the imaginary rotational axis in the first rotational direction generates the rotational motion of the shift shaft in the first rotational direction; and, in a second state, the handle is configured to pivot about the pivot bracket to a stowed state.

In an aspect, in at least the second state, the handle is configured to pivot about the pivot bracket, while the pivot bracket remains arranged about the shift shaft.

In an aspect, the engagement bracket portion includes a longitudinal member arranged to telescopingly engage with the second end of the handle, and wherein the longitudinal member includes a first plurality of adjustment apertures that are configured to align with a second plurality of adjustment apertures on the second end of the handle.

In an aspect, the handle includes the plurality of grooves and each of the plurality of grooves includes a translational groove portion and an expanded groove portion, the expanded groove portion arranged to engage with the pin.

In an aspect, the handle includes the plurality of grooves and the pin includes a first end and a second end, the first end arranged to engage with a first groove of the plurality of grooves and the second end arranged to engage with a second groove of the plurality of grooves, and the engagement bracket portion of the handle further includes a first arm and a second arm, the first arm including the first groove and the second arm including the second groove; and wherein the first arm has a first end and a second end and wherein the first groove is stepped or sloped between the first end and the second end of the first arm.

In an aspect, the second arm has a first end and a second end and wherein the second groove is stepped or sloped between the first end and the second end of the second arm.

In an aspect, the engagement bracket portion of the handle further includes a spring pin arranged between the first arm and the second arm.

In an aspect, the handle includes the plurality of notches arranged to engage with the pin, and wherein the pin includes a first end and a second end, the first end arranged to engage with a first notch of the plurality of notches and the second end arranged to engage with a second notch of the plurality of notches.

In an aspect, the pin further includes a first pin shroud proximate the first end of the pin and a second pin shroud proximate the second end of the pin where the first pin shroud is configured to engage with the first notch of the plurality of notches and the second pin shroud is configured to engage with the second notch of the plurality of notches.

In an aspect, the pin includes a threaded bolt, the threaded bolt having a threaded end and a non-threaded end, and wherein the first pin shroud includes a first pin shroud through-bore arranged to receive the non-threaded end of the threaded bolt, and wherein the second pin shroud includes a second pin shroud through-bore arranged to receive the threaded end of the threaded bolt.

In another example, a trailer landing gear system is provided, the trailer landing gear system including a first landing gear leg rotationally engaged with a cross-shaft of a landing gear assembly, a shift shaft connected to the first landing gear leg, and a handle assembly. The handle assembly includes a handle having a first end and a second end, the first end having a grip portion and the second end arranged proximate to an engagement bracket portion, the engagement bracket portion including a plurality of grooves or a plurality of notches, a pivot bracket pivotably secured to the engagement bracket portion, the pivot bracket including a through-bore arranged to receive the shift shaft of the trailer landing gear assembly, such that the pivot bracket is arranged about the shift shaft, a pin secured to a proximate end of the shift shaft, the shift shaft having an imaginary rotational axis, wherein, the plurality of grooves or the plurality of notches are arranged to engage with the pin such that rotation of the handle about the imaginary rotational axis in a first rotational direction generates a rotational motion of the shift shaft in the first rotational direction.

In an aspect, in a first state, the plurality of grooves or the plurality of notches are arranged to engage with the pin and such that rotation of the handle about the imaginary rotational axis in the first rotational direction generates the rotational motion of the shift shaft in the first rotational direction; and, in a second state, the handle is configured to pivot about the pivot bracket to a stowed state.

In an aspect, in at least the second state, the handle is configured to pivot about the pivot bracket, while the pivot bracket remains arranged about the shift shaft.

In an aspect, the plurality of grooves each include a translational groove portion and an expanded groove portion, the expanded groove portion arranged to engage with the pin.

In an aspect, the pin includes a first end and a second end, the first end arranged to engage with a first groove of the plurality of grooves and the second end arranged to engage with a second groove of the plurality of grooves; wherein the engagement bracket portion of the handle further includes a first arm and a second arm, the first arm including the first groove and the second arm including the second groove; and wherein the first arm has a first end and a second end and wherein the first groove is stepped or sloped between the first end and the second end of the first arm.

In an aspect, the second arm has a first end and a second end and wherein the second groove is stepped or sloped between the first end and the second end of the second arm.

In an aspect, the handle includes the plurality of notches arranged to engage with the pin, and wherein the pin includes a first end and a second end, the first end arranged to engage with a first notch of the plurality of notches and the second end arranged to engage with a second notch of the plurality of notches.

In an aspect, the pin further includes a first pin shroud proximate the first end of the pin and a second pin shroud proximate the second end of the pin where the first pin shroud is configured to engage with the first notch of the plurality of notches and the second pin shroud is configured to engage with the second notch of the plurality of notches.

In an aspect, the pin includes a threaded bolt, the threaded bolt having a threaded end and a non-threaded end, and wherein the first pin shroud includes a first pin shroud through-bore arranged to receive the non-threaded end of the threaded bolt, and wherein the second pin shroud includes a second pin shroud through-bore arranged to receive the threaded end of the threaded bolt.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 6A is a top plan view of a handle assembly according to the present disclosure.

FIG. 6B is a top plan view of a portion of a handle assembly according to the present disclosure.

FIG. 10 is an exploded perspective view of a handle assembly according to the present disclosure.

DETAILED DESCRIPTION OF EMBODIMENTS

The present disclosure is related to an improved handle assembly and a trailer landing gear system with an improved handle assembly. The handle assembly includes a handle with a grip portion and an engagement bracket portion, where the engagement bracket portion includes a plurality of grooves or a plurality of notches. The handle assembly also includes a pivot bracket pivotably secured to the engagement bracket portion, the pivot bracket including a through-bore arranged to receive a shift shaft of a trailer landing gear assembly, such that the pivot bracket is arranged about the shift shaft. The handle assembly further includes a pin secured to a proximate end of the shift shaft, the shift shaft having an imaginary rotational axis wherein the plurality of grooves are arranged to engage with the pin such that rotation of the handle about the imaginary rotational axis in a first rotational direction generates a rotational motion of the shift shaft in the first rotational direction. The present trailer landing gear system and handle assembly provide a pivotable handle assembly which is continuously connected to the shift shaft of the trailer landing gear system such that the handle assembly is always located proximate the shift shaft and is ready to be pivoted into an engaged position quickly and efficiently. Additionally, the handle assembly can be pivoted away and stowed such that there is no interference between the stowed handle and the rotating shift shaft during transportation of a tractor trailer.

Figure 1:
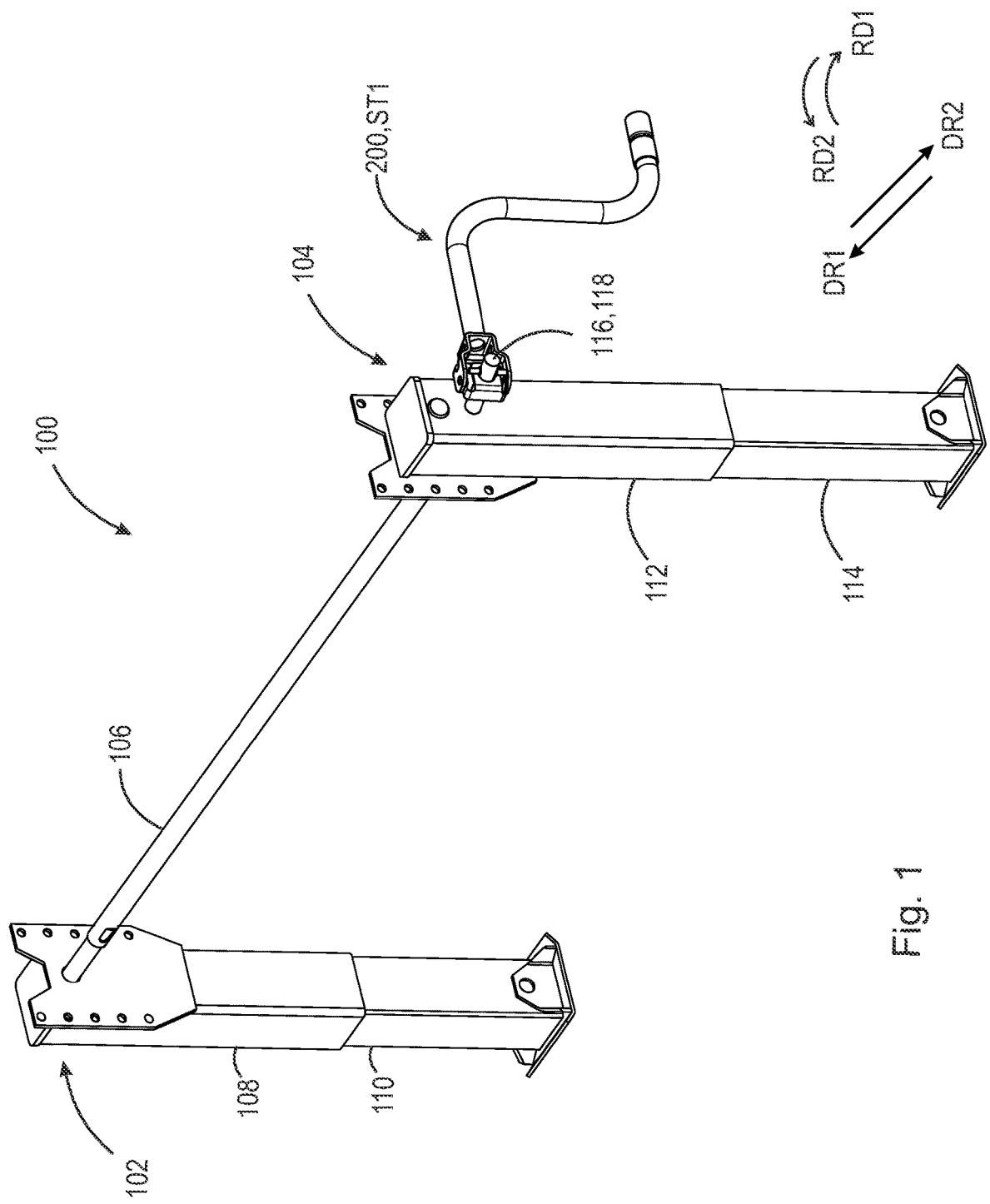
FIG. 1 is a perspective view of a trailer landing gear system according to the present disclosure.

Transitioning now to the figures, FIG. 1 illustrates a perspective view of trailer landing gear system 100 according to the present disclosure. It should be appreciated that, although not illustrated for clarity, during operation of trailer landing gear system 100, a trailer may be provided, where trailer landing gear system 100 is fixedly secured to the underside of the trailer so that it may stabilize the front portion of the trailer when disassembled from a tractor or semi-truck. Generally, trailer landing gear system 100 includes a first leg assembly 102, a second leg assembly 104, and a cross-shaft 106.

First leg assembly 102 includes a first leg housing 108 and a first leg 110. First leg housing 108 includes a substantially hollow longitudinal member arranged to telescopingly engage with first leg 110. First leg 110 is intended to fit within and slidingly engage with first leg housing 108 such that, when retracted a substantial portion of first leg 110 is arranged within first leg housing 108 and when expanded a substantial portion of first leg 110 is arranged outside of first leg housing 108. Although not illustrated, one or more gears may be arranged between first leg 110 and cross-shaft 106 such that torque or rotational forces of cross-shaft 106 can be transferred 90 degrees to first leg 110 when operating trailer landing gear assembly 100 from the retracted state to the expanded state.

Similarly, second leg assembly 104 includes a second leg housing 112 and a second leg 114. Second leg housing 112 includes a substantially hollow longitudinal member arranged to telescopingly engage with second leg 114. Second leg 114 is intended to fit within and slidingly engage with second leg housing 112 such that, when in the retracted state a substantial portion of second leg 114 is arranged within second leg housing 112 and when in an expanded state a substantial portion of second leg 114 is arranged outside of second leg housing 112. Although not illustrated, one or more gears may be arranged between second leg 114 and cross-shaft 106 such that torque or rotational forces of cross-shaft 106 can be transferred 90 degrees to second leg 114 when operating trailer landing gear system 100 from the retracted state to the expanded state. The terminal ends of each leg may include a foot, as illustrated, to disperse the weight of the trailer when in the expanded state as well as provide a level surface upon which the legs may stand.

As will be discussed below, trailer landing gear system 100 can include a handle assembly 200 arranged to provide a manual means of rotating a shift shaft 116, which in turn (via one or more gears of the first and second leg assemblies and the cross-shaft 106), lowers or raises the legs of the trailer landing gear system 100. As illustrated, the shift shaft 116 includes a proximate end 118 and a distal end 120 (shown in FIG. 2), where the proximate end is arranged to receive handle assembly 200 and the distal end 120 is arranged to engage with the one or more gears of one of the leg assemblies described above. In the examples provided below, it should be appreciated that shift shaft 116 can include a hole, aperture, or through-bore through and within proximate end 118 to receive pin 206 (discussed below).

Figure 2:
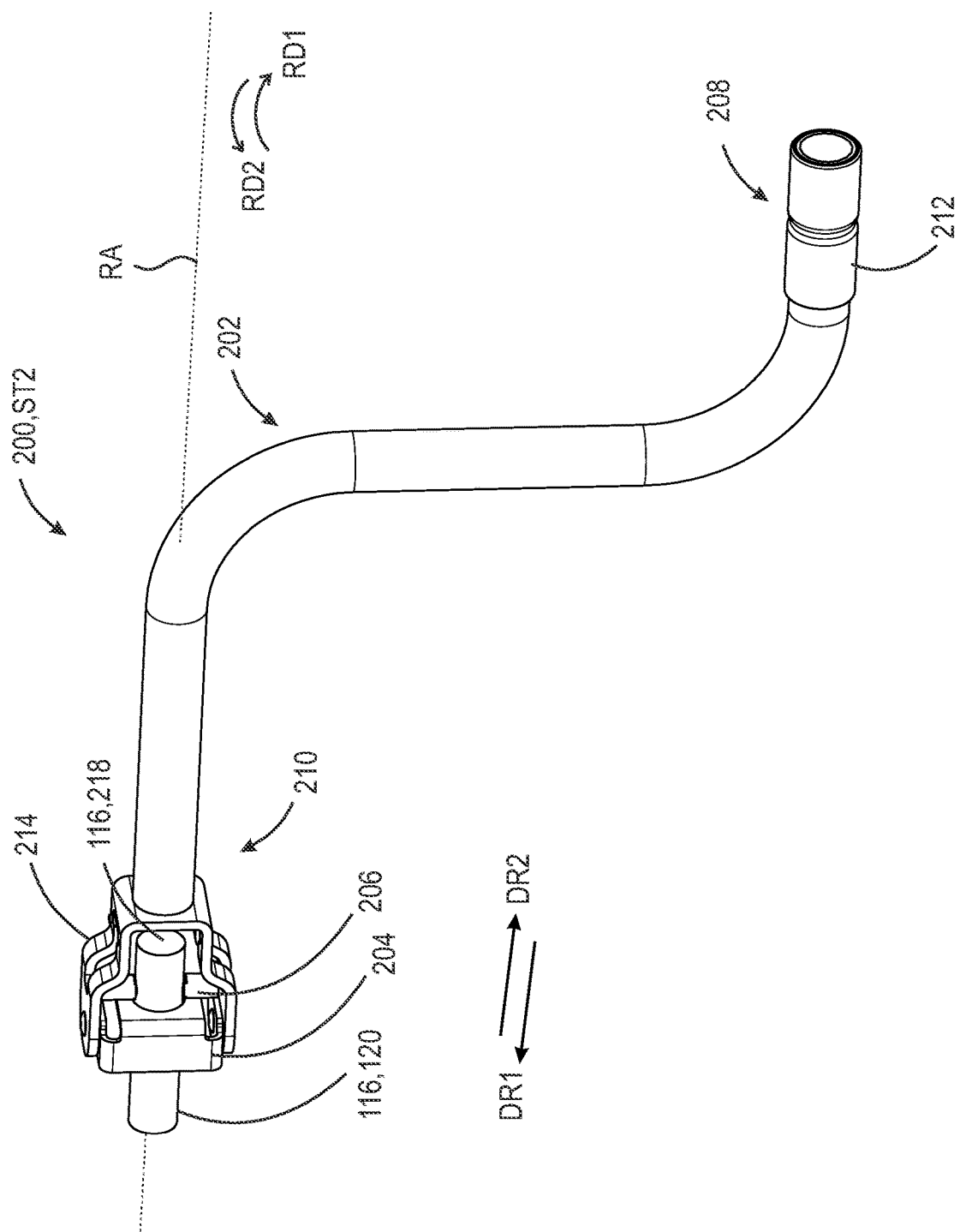
FIG. 2 is a perspective view of a handle assembly according to the present disclosure.
Figure 3:
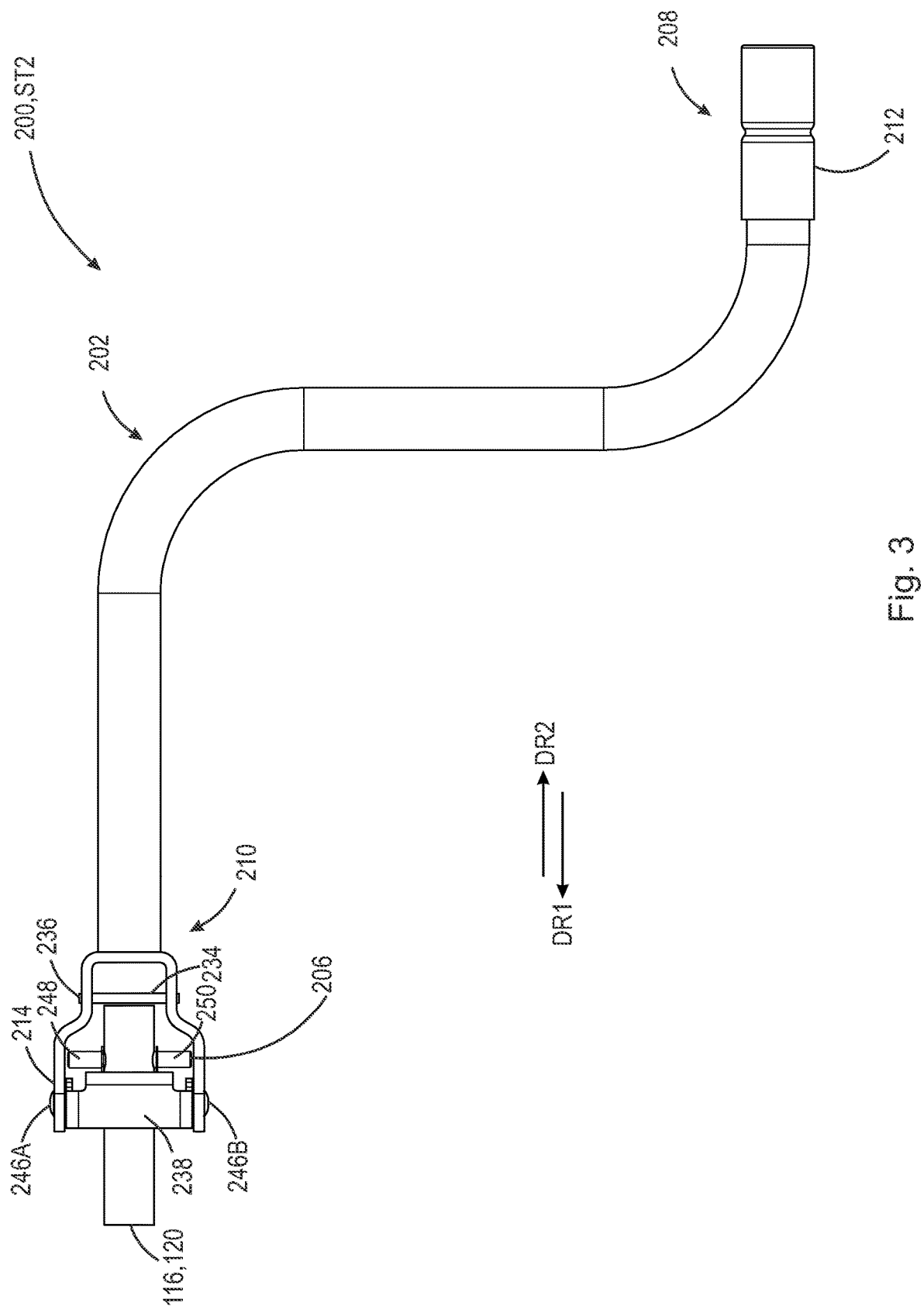
FIG. 3 is a side elevational view of a handle assembly according to the present disclosure.

The following description should be read in view of FIGS. 2-8. FIGS. 2-3 illustrate a front perspective view and a side elevational view, respectively, of an improved handle assembly 200 according to the present disclosure. As shown, handle assembly 200 includes a handle 202, a pivot bracket 204 and a pin 206.

As shown, handle 202 has a first end 208 and a second end 210. Handle 202 includes a grip portion 212 proximate the first end 208 and an integral engagement bracket portion 214 proximate the second end 210. It should be appreciated that engagement bracket portion 214 can be integrally formed as a part of handle 202, or may be a separable portion arranged to engage or secure to the handle 202 as shown in FIG. 2 and in the examples illustrated in FIGS. 9-10. Between first end 208 and second end 210, handle 202 can include a plurality of bends and straight portions substantially forming a crank handle shape to aid in generating rotational torque through a rotational cranking motion about imaginary rotational axis RA. Grip portion 212 is intended to be a portion of handle 202 proximate the first end 208 where a user or operator of a trailer landing gear system, e.g., trailer landing gear system 100, can grab handle 202 and generate a rotational motion of shift shaft 120 about imaginary rotational axis RA to extend or retract the legs of the system. Grip portion 212 can be an integral or separable component configured to rotate independently of the rotation of handle 202 about imaginary rotational axis RA (hereinafter "rotational axis RA") such that the user's or operator's hand can remain in substantially the same orientation with respect to their body while rotating the handle 202 about rotational axis RA. Alternatively, grip portion 212 may be a rotationally fixed component and the user can relax their grip around grip portion 212 while cranking the handle 202 in a first rotational direction RD1 or a second rotational direction RD2 (discussed below). It should be appreciated that handle 202 and the other components discussed herein can be made from steel, iron, cast-iron, or any other material with sufficient hardness, strength, or overall durability to withstand the rotational loads required to crank or actuate the legs of trailer landing gear system 100 discussed above.

Figure 4:
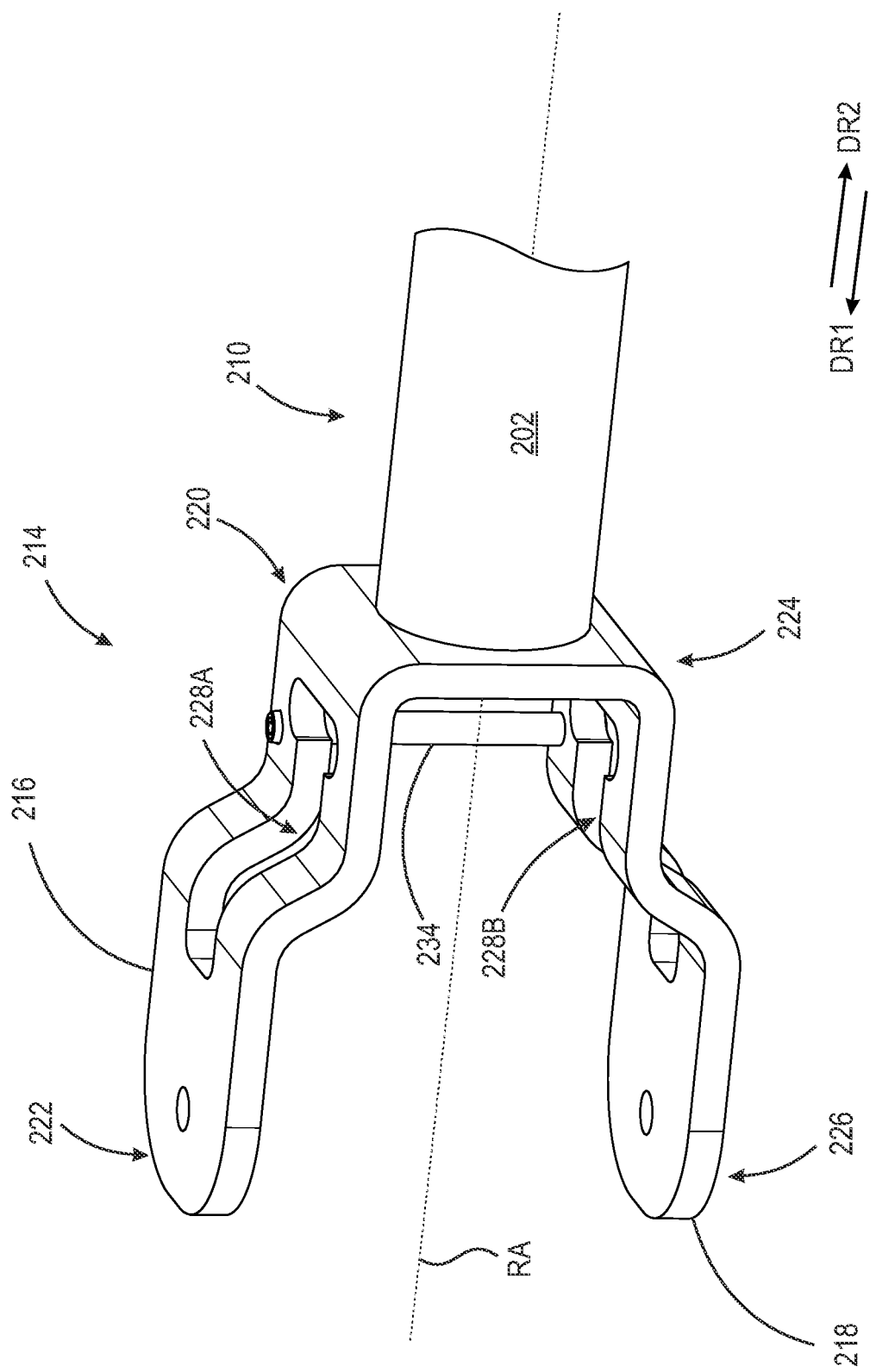
FIG. 4 is a perspective view of an engagement bracket portion of a handle according to the present disclosure.

FIG. 4 is a perspective view of engagement bracket portion 214 shown without pivot bracket 204 or pin 206 for clarity. As shown, engagement bracket portion 214 is arranged proximate to second end 210 of handle 202. As described above, engagement bracket portion 214 can be integrally formed with the rest of handle 202 or may be formed separately and non-rotatably secured to the second end 210 of handle 202, e.g., by welding, threading, etc. Engagement bracket portion 214 includes two arms, e.g., first arm 216 and second arm 218. First arm 216 and second arm 218 extend away from second end 210 of handle 202 and are substantially parallel with rotational axis RA as shown. First arm 216 includes a first end 220 and a second end 222, where the first end 220 is the end of first arm 216 that is closest to the rest of handle 202 while second end 222 is the end of first arm 216 that is farthest from the rest of handle 202. First arm 216 also includes a step or slope feature between first end 220 and second end 222. The step or slope feature is configured such that the lower portion of the stepped or sloped arm is proximate first end 220 and handle 202 while the higher portion of the stepped or sloped arm is proximate second end 222. Similarly, second arm 218 includes a first end 224 and a second end 226, where the first end 224 is the end of second arm 218 that is closest to the rest of handle 202 while second end 226 is the end of second arm 218 that is farthest from the rest of handle 202. Second arm 218 also includes a step or slope feature between first end 224 and second end 226. The step or slope feature is configured such that the upper portion of the stepped or sloped arm is proximate first end 224 while the lower portion of the stepped or sloped arm is proximate second end 226. Additionally, the upper portion of first arm 216 includes a hole, aperture, or through-bore configured to receive a connector 246 (discussed below), e.g., a rivet or bolt, to pivotably secure first arm 216 with tab 244A of first planar portion 238 of pivot bracket 204 (discussed below). Similarly, the lower portion of second arm 218 includes a hole, aperture, or through-bore configured to receive a connector 246 (discussed below), e.g., a rivet or bolt, to pivotably secure second arm 218 with tab 244B of first planar portion 238 of pivot bracket 204 (discussed below).

Additionally, engagement bracket portion 214 includes a plurality of grooves 228A-228B (collectively referred to herein as "plurality of grooves 228" or "grooves 228"). For example, first arm 216 includes a first groove 228A arranged between first end 220 and second end 222 of first arm 216, and second arm 218 includes a second groove 228B arranged between first end 224 and second end 226 of second arm 218. Each groove, e.g., first groove 228A and second groove 228B, are configured such that they are disposed through and within each arm, i.e., first arm 216 and second arm 218, respectively, such that each groove 228 also includes a stepped or sloped feature corresponding with the stepped or slope feature of each arm as discussed above. Additionally, as illustrated in FIGS. 4-6B, each groove 228 is arranged substantially in the center of engagement bracket portion 214, e.g., in line or substantially aligned with rotational axis RA such that there is an equal amount of engagement bracket portion 214 on either side of each groove 228.

Figure 5:
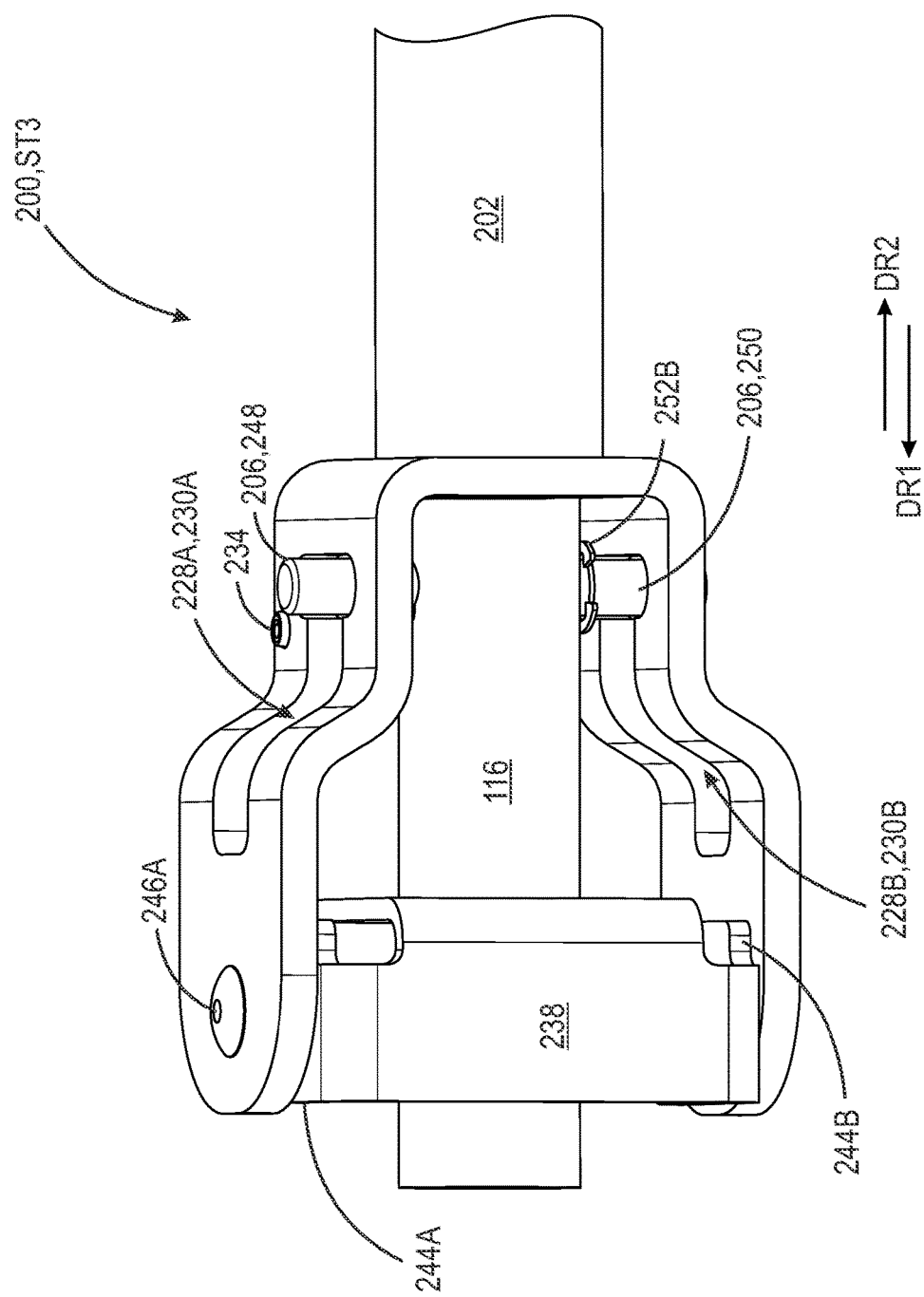
FIG. 5 is a side perspective view of an engagement bracket portion of a handle according to the present disclosure.
Figure 7:
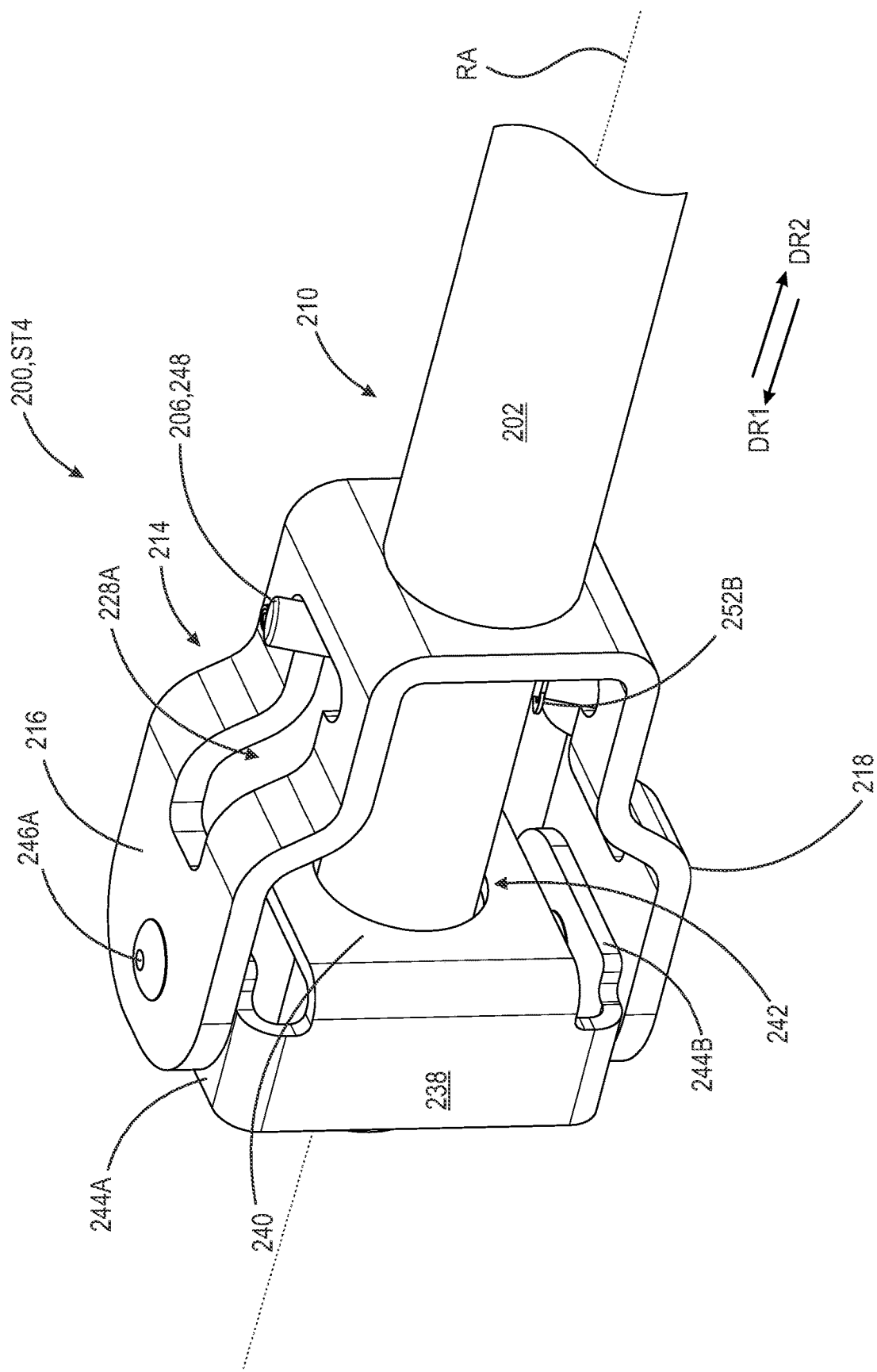
FIG. 7 is a perspective view of a portion of a handle assembly according to the present disclosure.

As illustrated in FIGS. 5-6B, each groove 228 includes a translational portion 230A-230B (collectively referred to herein as "translational portion 230") and an expanded portion 232A-232B (collectively referred to herein as "expanded portion 232"). For example, the translational portion 230A of first groove 228A, shown in FIG. 6B, includes the portion of first groove 228A that begins proximate second end 222 of first arm 216 and continues until it reaches the expanded portion 232A, located proximate first end 220 of first arm 216. Translational portion 230A includes a portion of groove 228A that is substantially longitudinal with a substantially uniform width, i.e., a first width W1 sufficient to receive and slidingly engage with first end 248 of pin 206 (discussed below). Similarly, translational portion 230B of second groove 228B, includes the portion of second groove 228B that begins proximate second end 226 of second arm 218 and continues until it reaches the expanded portion 232B, located proximate first end 224 of second arm 218. Translational portion 230B includes a portion of groove 228B that is substantially longitudinal with a substantially uniform width, i.e., first width W1 sufficient to receive and slidingly engage with second end 250 of pin 206 (discussed below).

Each expanded portion 232 of each respective arm is intended to include a portion of each groove 228 that has a greater width than the width of the respective translational portion 230 of each groove 228. For example, first expanded portion 232A of first groove 228A has a larger width, i.e., a second width W2, than the width W1 of translational portion 230A. In some examples, second width W2 is at least two times the first width W1, e.g., at least two times the width of the first end 248 of pin 206 (discussed below). Likewise, although not shown, second expanded portion 232B of second groove 228B has a larger width than the first width W1 of translational portion 230B, i.e., a second width W2. In some examples, second width W2 is at least two times the first width W1, e.g., at least two times the width of the second end 250 of pin 206 (discussed below). As will be discussed below in detail, each side of each expanded portion 232 is arranged to receive and slidingly engage with an end of pin 206 to rotatingly engage shift shaft 116 with handle 202 such that manual rotation of handle 202 about rotational axis RA results in rotation of shift shaft 116 about rotational axis RA. In some examples, as illustrated in FIG. 6B, each expanded portion 232 includes a left engagement area LEA and a right engagement area REA. Each engagement area is configured to slidingly engage with and disengage with the respective ends of pin 206 (as will be discussed below). It should be appreciated that the area of the left and right engagement areas can be selected such that the length and width of each area are larger than, or slightly larger than, the diameter of the respective ends of pin 206 (discussed below).

As illustrated in FIGS. 3-4, 6A-6-B, and 8, engagement bracket portion 214 also includes a spring pin 234. As shown in FIG. 4, spring pin 234 is intended to be a unitary fastener used to join or connect both arms of engagement bracket portion 214, i.e., join first arm 216 and second arm 218. In some examples, spring pin 234 includes a spring that expands upon insertion within corresponding apertures or through-bores arranged within and through each arm of engagement bracket portion 214. As shown in FIGS. 4-6B, spring pin 234 is configured off center within engagement bracket portion 214, e.g., to the left or right of the center of engagement bracket portion 214 or left and right of the rotational axis RA. As will be discussed below in detail, spring pin 234 is provided to prevent pivoting of handle 202 in one of the two potential pivoting/rotational directions when disengaging and stowing the handle 202, i.e., within the transition to the stowed state ST1 (discussed below). It should be appreciated that spring pin 234 is but one example of a mechanism that can be employed to prevent this unwanted pivoting/rotation of handle 202, and other mechanisms may be utilized. For example, a bolt, solid pin, solid wall, or other obstructive object or component may be provided to one side of the engagement bracket portion 214 such that pivoting or rotation of handle 202 in a limited number of directions is possible.

Figure 8:
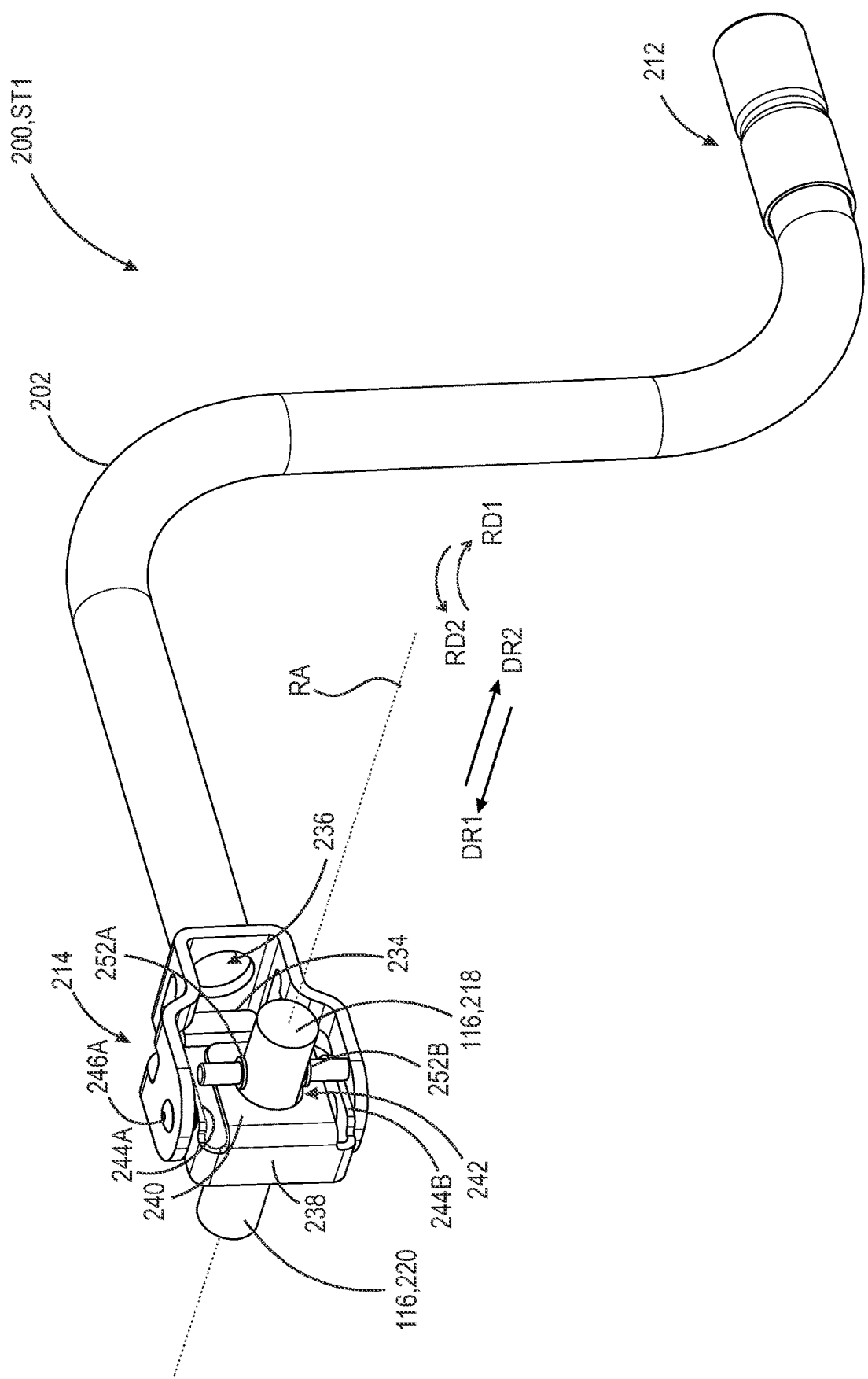
FIG. 8 is a perspective view of a handle assembly in a stowed state according to the present disclosure.

Additionally, as illustrated in FIG. 8, engagement bracket portion 214 also includes a through-bore or recess 236. Through-bore or recess 236 is arranged within engagement bracket portion 214 proximate the transition between engagement bracket portion 214 and the rest of handle 202 and between first arm 216 and second arm 218. Through-bore or recess 236 is intended to be circular in shape and be sized such that the diameter of the through-bore or recess 236 of engagement bracket portion 214 is less than the diameter of shift shaft 116 such that when handle assembly 200 is translated from second state ST2 (shown in FIG. 3) to third state ST3 (shown in FIGS. 5-6B and discussed below) shift shaft 116 fits within through-bore or recess 236 and maintains alignment between shift shaft 116 and handle 202 of handle assembly 200.

As discussed above, handle assembly 200 also includes pivot bracket 204. As shown in FIGS. 2-3, 5, and 7-8, pivot bracket 204 includes a first planer portion 238, a second planer portion 240, and a through-bore 242. First planer portion 238 is configured such that during operation, the planar surface of first planar portion 238 is located within a substantially vertical plane, i.e., a plane arranged orthogonally to the ground beneath handle assembly 200 and substantially parallel with rotational axis RA when at rest as shown. First planar portion 238 also includes a plurality of tabs 244A-244B (collectively referred to herein as "plurality of tabs 244" or "tabs 244") at opposite sides of the first planar portion 238. Each tab 244 includes an inward bend, i.e., bent toward shift shaft 116 with respect to first planar portion 238, such that the planar surfaces of each tab of plurality of tabs 244 are substantially parallel with the planar surfaces of first arm 216 and second arm 218 of engagement bracket portion 214. Each tab 244 includes a hole, aperture, or through-bore configured to receive a connector 246, e.g., a rivet or bolt, and align and pivotably secure pivot bracket 204 to engagement bracket portion 214, via the holes, apertures, or through-bores in each arm as discussed above. In other words, a connector 246 is configured through a hole, aperture, or through-bore of first tab 244A as well as through a hole, aperture, or through-bore on the upper portion of first arm 216, such that pivot bracket 204 and engagement bracket portion 214 of handle 202 can pivot or rotate with respect to each other about the connector 246. Similarly, another connector 246 is configured to go through a hole, aperture, or through-bore of second tab 244B as well as go through the hole, aperture, or through-bore on the lower portion of second arm 218, such that pivot bracket 204 and engagement bracket portion 214 of handle 202 can pivot or rotate with respect to each other about the connector 246.

Pivot bracket 204 also includes a second planar portion 240. Second planar portion 240 is intended to be integral with first planar portion 238 and arranged such that rotational axis RA is orthogonal to and passes through the planar surface of second planar portion 240. Thus, second planar portion 240 is substantially orthogonal to the planar surface of first planar portion 238. Second planar portion 240 includes a through-bore 242 (shown in FIGS. 7-8). Through-bore 242 is substantially centered on the planar surface of second planar portion 240 and arranged to slide over and be positioned radially about shift shaft 116. Through-bore 242 is configured such that, at all times following installation of handle assembly 200, e.g., at least during operation of trailer landing gear system 100, second planar portion 240 is arranged about shift shat 116. In other words, shift shaft 116 is configured to slidingly engage with through-bore 242. Although second planar portion 240 is configured to slidingly engage with shift shaft 116 and slidingly translate forward and backward along rotational axis RA at various positions during the state transitions discussed below, the second planar portion 240 remains engaged about shift shaft 116 at all times after installation. It should be appreciated that the shape and diameter of through-bore 242 can be configured such that it substantially complements or mirrors the cross-sectional shape of shift shaft 116 and has a diameter that is greater than the diameter of shift shaft 116 such that second planar portion 240 of pivot bracket 204 can slidingly engage with shift shaft 116.

Handle assembly 200 further includes a pin 206. Pin 206 is a substantially solid longitudinal member arranged to sit within and engage with the hole, aperture, or through-bore in the proximate end 118 of shift shaft 116. As shown in FIG. 3, pin 206 includes a first end 248 and a second end 250. First end 248 of pin 206 is arranged to slidingly engage and disengage with first groove 228A of plurality of grooves 228 of first arm 216 of engagement bracket portion 214. Second end 250 of pin 206 is arranged to slidingly engage and disengage with second groove 228B of plurality of grooves 228 of second arm 218 of engagement bracket portion 214. Pin 206 is secured within the hole, aperture, or through-bore at the proximate end 118 of shift shaft 116 via a plurality of retaining devices 252A-252B (collectively referred to herein as "retaining devices 252"), e.g., retaining rings, clamps, detents, etc. As shown in FIGS. 5, 6B, and 7-8, a first retaining device 252A is positioned outside of the hole, aperture, or through-bore of the shift shaft 116 and about the outer circumferential surface of the first end 248 of pin 206. Also, a second retaining device 252B is positioned outside of the hole, aperture, or through-bore of the shift shaft 116 and about the outer circumferential surface of the second end 250 of pin 206. Thus, the two retaining devices 252A-252B are arranged about pin 206 and on either side of shift shaft 116 and are configured to prevent pin 206 from sliding out of the hole, aperture, or through-bore of the shift shaft 116. It should be appreciated that first end 248 and second end 250 of pin 206 can both include a recessed circumferential groove arranged to receive first retaining device 252A and second retaining device 252B, respectively, to prevent the retention devices from sliding with respect to pin 206.

During operation of trailer landing gear system 100, it is desirable (at least in certain circumstances) to allow the operator to manually raise or lower the legs of the trailer landing gear system 100 using handle assembly 200. As shown in FIG. 8, while driving or transporting the trailer (not shown), the handle assembly 200 is arranged in a first state ST1 (hereinafter "first state ST1" or "stowed state ST1"), i.e., a state where handle 202 has been pivoted out of alignment with shift shaft 116 and has been stowed or otherwise affixed to a portion of the trailer or trailer landing gear system 100. It should be appreciated that, as described above, even during stowed state ST1 pivot bracket 204 remains disposed about shift shaft 116 via sliding engagement with through-bore 242.

When the tractor operator desires to manually raise or lower the legs of trailer landing gear system 100, the operator can pivot handle 202 about connectors 246, i.e., about the connectors arranged to pivotably secure first arm 216 and second arm 218 of engagement bracket portion 214 with the respective tabs 244 of the first planar portion 238 of pivot bracket 204. By pivoting handle 202 to be in alignment with shift shaft 116, handle assembly 200 has been transitioned from the first, stowed state ST1 to a second state ST2. Second state ST2 (shown in FIGS. 2-3) represents the state of handle assembly 200 where handle 202 is substantially aligned with or inline with shift shaft 116 and/or rotational axis RA, and where engagement bracket portion 214 is not engaged or slidingly engaged with pin 206. From the second state ST2, i.e., in an inline and disengaged position, the tractor operator can transition handle assembly 200 to a third state ST3 (shown in FIGS. 5-6B) by sliding handle 202 in a first direction DR1 along rotational axis RA such that first end 248 and second end 250 of pin 206 slidingly engages with the inside of first groove 228A and second groove 228B, respectively, of engagement bracket portion 214. During the transition from the second state ST2 (shown in FIGS. 2-3) to the third state ST3 (shown in FIGS. 5-6B), the first end 248 of pin 206 slidingly engages with translational groove portion 230A until it stops within expanded groove portion 232A when first end 248 of pin 206 contacts the back of expanded groove portion 232A. Simultaneously, second end 250 of pin 206 slidingly engages with translational groove portion 230B until it stops within expanded groove portion 232B when second end 250 contacts the back of expanded groove portion 232B.

From the third state ST3 (shown in FIGS. 5-6B), the tractor operator can rotate handle 202 in a first rotational direction RD1 (e.g., clockwise) to secure first end 248 of pin 206 within the right engagement area REA of first expanded groove portion 232A of first groove 228A, and secure second end 250 of pin 206 within the left engagement area LEA of second expanded groove portion 232B of second groove 228B. In this fourth and final state ST4 (shown in FIG. 7), i.e., where first end 248 of pin 206 is secured within the right engagement area REA of expanded groove portion 232A of first groove 228A and second end 250 of pin 206 is secured within the left engagement area LEA of expanded groove portion 232B, the operator can continue to rotate or crank handle 202 in the first rotational direction RD1 about rotational axis RA, which will transfer rotational torque from the handle 202 to each leg of the trailer landing gear system 100, via cross-shaft 106 and/or the one or more gears within each leg to, e.g., raise the legs of the trailer landing gear system 100.

Alternatively, and although not shown, from the third state ST3 (shown in FIGS. 5-6B), the tractor operator can rotate handle 202 in a second rotational direction RD2 (e.g., counter-clockwise) to secure first end 248 of pin 206 within the left engagement area LEA of first expanded groove portion 232A of first groove 228A, and secure second end 250 of pin 206 within the right engagement area REA of second expanded groove portion 232B of second groove 228B. In this fourth and final state ST4 (not shown), i.e., where first end 248 of pin 206 is secured within the left engagement area LEA of expanded groove portion 232A of first groove 228A and second end 250 of pin 206 is secured within the right engagement area REA of expanded groove portion 232B, the operator can continue to rotate or crank handle 202 in the second rotational direction RD2 about rotational axis RA, which will transfer rotational torque from the handle 202 to each leg of the trailer landing gear system 100, via cross-shaft 106 and/or the one or more gears within each leg to, e.g., raise the legs of the trailer landing gear system 100.

When the operator is satisfied with the current position of the legs of the trailer landing gear system 100, the operator can proceed through each state recited above in the reverse order so that the handle assembly 200 is placed in the stowed state, i.e., ST1 (shown in FIG. 8). For example, from the fourth state ST4 (shown in FIG. 7) the operator can rotate handle 202 such that first end 248 and second end 250 of pin 206 are disengaged with the right engagement area and left engagement areas of expanded groove portions 232A and 232B to transition handle assembly to the third state ST3 (shown in FIGS. 5-6B). From the third state ST3, the operator can pull handle 202 in second direction DR2, opposite first direction DR1, such that pin 206 slidingly disengages from grooves 228A and 228B, placing handle assembly 200 in second state ST2 (shown in FIGS. 2-3). From the second state ST2, the operator can pivot handle 202 about connectors 246 and out of alignment with shift shaft 116, to the stowed state ST1 (shown in FIG. 8), where handle 202 can be clamped or otherwise secured to a portion of the trailer landing gear system 100 and/or the trailer (not shown) for safe and secure storage during transportation. When transitioning handle assembly 200 from the second state ST2 (shown in FIGS. 2-3) to the stowed state ST1 (shown in FIG. 8), the presence of spring pin 234 prevents pivoting of engagement bracket portion 214 (and by extension prevents pivoting of handle 202) in one direction, e.g., prevents the operator from pivoting handle 202 away from the appropriate storage location for the handle 202 on the trailer (not shown) or the trailer landing gear system 100.

Figure 9:
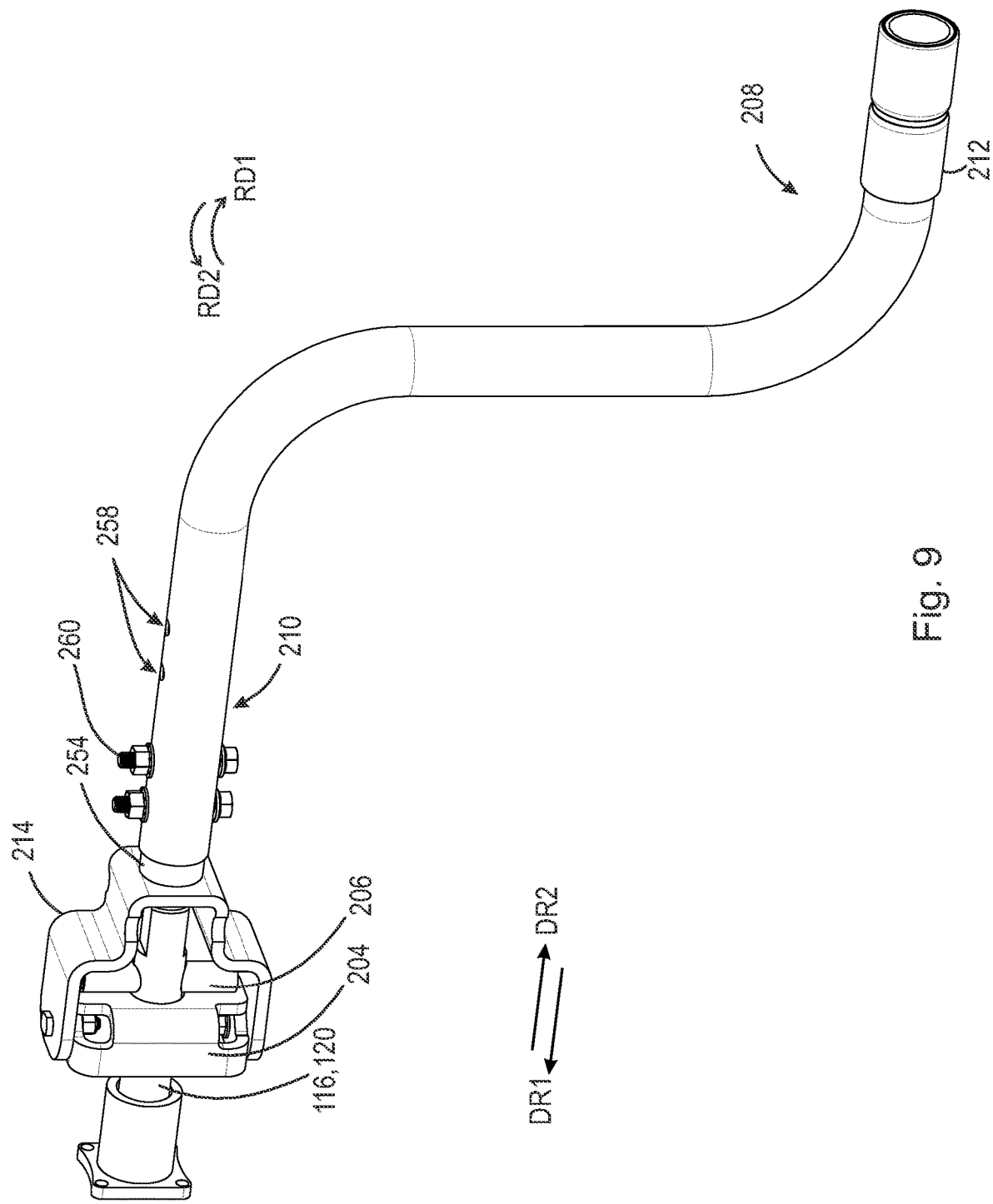
FIG. 9 is a perspective view of a handle assembly according to the present disclosure.

The following description should be read in view of FIGS. 9-16. FIGS. 9-10 illustrate a front perspective view and a front-perspective exploded view, respectively, of an alternative improved handle assembly 200 according to the present disclosure. In this alternative embodiment, engagement portion 214 is a separable component from the rest of handle 202 and includes a longitudinal member 254 integrally formed on and is secured to engagement portion 214 proximate the first end 220 of first arm 216 and first end 224 of second arm 218. It should be appreciated that, although illustrated as an integral component, longitudinal member 254 may also be a separable component from engagement portion 214, e.g., longitudinal member 254 may be rotatingly or otherwise fixedly secured to engagement portion 214. Longitudinal member 254 is configured to slidingly or telescopingly engage with second end 210 of handle 202 such that different handle lengths may be set by the operator of the trailer landing gear system 100. To that end, second end 210 of handle 202 can be a cylindrical portion of handle 202 and can be hollow so as to receive at least a portion of the length of longitudinal member 254. In one example, as illustrated in FIG. 9, second end 210 of handle 202 is a hollow cylindrical member with a first diameter and longitudinal member 254 is a hollow cylindrical member of a second diameter, where the second diameter is smaller than the first diameter such that the longitudinal member 254 is configured to telescopingly and slidingly engage with and within the inner circumferential surface of second end 210 of handle 202. It should be appreciated that the diameter of the longitudinal member 254 can be larger than the diameter of the second end 210 of handle 202 such that longitudinal member 254 is configured to telescopingly and slidingly engage with, over, and about the outer circumferential surface of second end 210 of handle 202. Furthermore, it should be appreciated that second end 210 of handle 202 and longitudinal member 254 do not need to be cylindrical members and may take any complementary shape to one another that would allow for telescoping or sliding engagement between the two members, e.g., rather than each member having a circular cross-section each member can have an oval cross-section, a square cross-section, an octagonal cross-section, a hexagonal cross-section, etc.

Additionally, second end 210 of handle 202 is configured to engage with longitudinal member 254 along a plurality of discrete positions such that the length of handle assembly 200 is adjustable to each of the discrete positions. For example, as shown in FIGS. 9-10, longitudinal member 254 of engagement portion 214 includes a first plurality of adjustment apertures 256 arranged in line along rotational axis RA, and second end 210 of handle 202 includes a second plurality of adjustment apertures 258 arranged in line along rotational axis RA. In some examples, the first plurality of adjustment apertures 256 include a first plurality of paired apertures, for example, a first aperture of the pair can be positioned on one side of longitudinal member 254 while the other aperture of the pair can be positioned on the opposing side of longitudinal member 254 substantially forming a through-bore between each of the paired first adjustment apertures 256 where the through-bore is arranged along an axis substantially orthogonal to the rotational axis RA. Similarly, the second plurality of adjustment apertures 258 include a second plurality of paired apertures, for example, a first aperture of the pair can be positioned on one side of handle 202 while the other aperture of the pair can be positioned on the opposing side of 202 substantially forming a through-bore between each of the paired second adjustment apertures 258 where the through-bore is arranged along an axis substantially orthogonal to the rotational axis RA. As will be discussed below, prior to operation of handle assembly 200, the operator of the trailer landing gear system 100 can adjust the overall length of handle assembly 200, by sliding or telescoping handle 202 with respect to longitudinal member 254 until handle 202 is at a desired position. At the desired position, the operator can align a pair of first adjustment apertures 256 and a pair of second adjustment apertures 258. Once aligned, the operator can lock the handle 202 in the desired length position by sliding at least one adjustment fastener 260 through the pair of first adjustment apertures 256 and the pair of second adjustment apertures 258 such that the handle 202 is prevented from sliding or shifting along rotational axis RA with respect to longitudinal member 254 of engagement portion 214. Although illustrated as a combination of a threaded hex bolt and nut, it should be appreciated that adjustment fastener 260 can be any fastener capable of securing longitudinal member 254 to second end 210 of handle 202, e.g., a pin, bolt, screw, capped rod, etc.

Figure 11A:
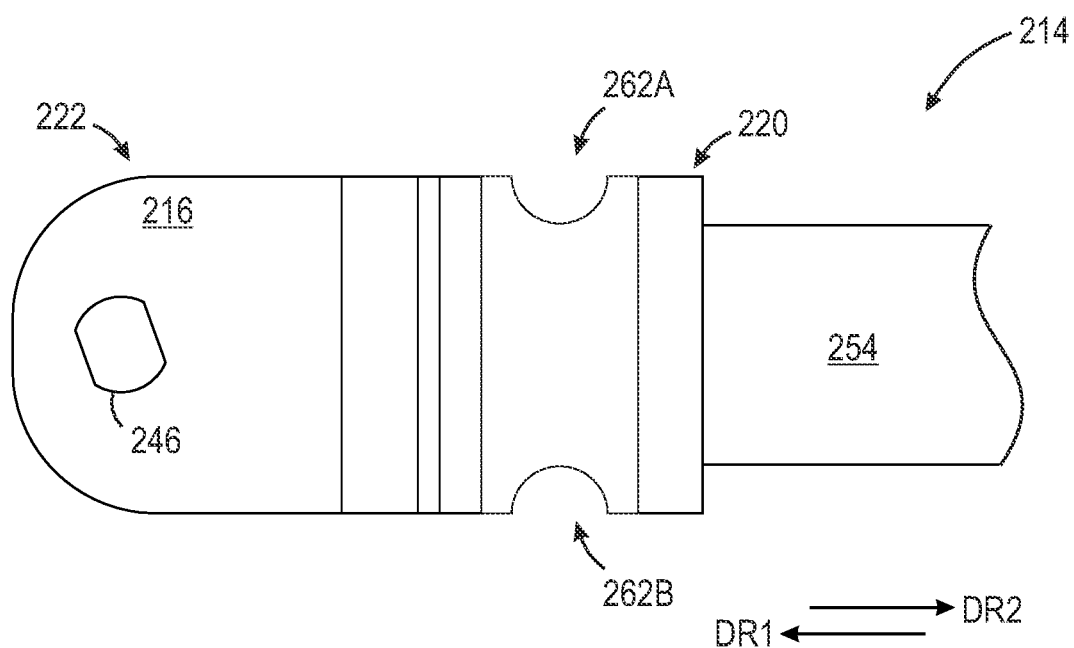
FIG. 11A is a top plan view of an engagement bracket portion of a handle assembly according to the present disclosure.
Figure 11B:
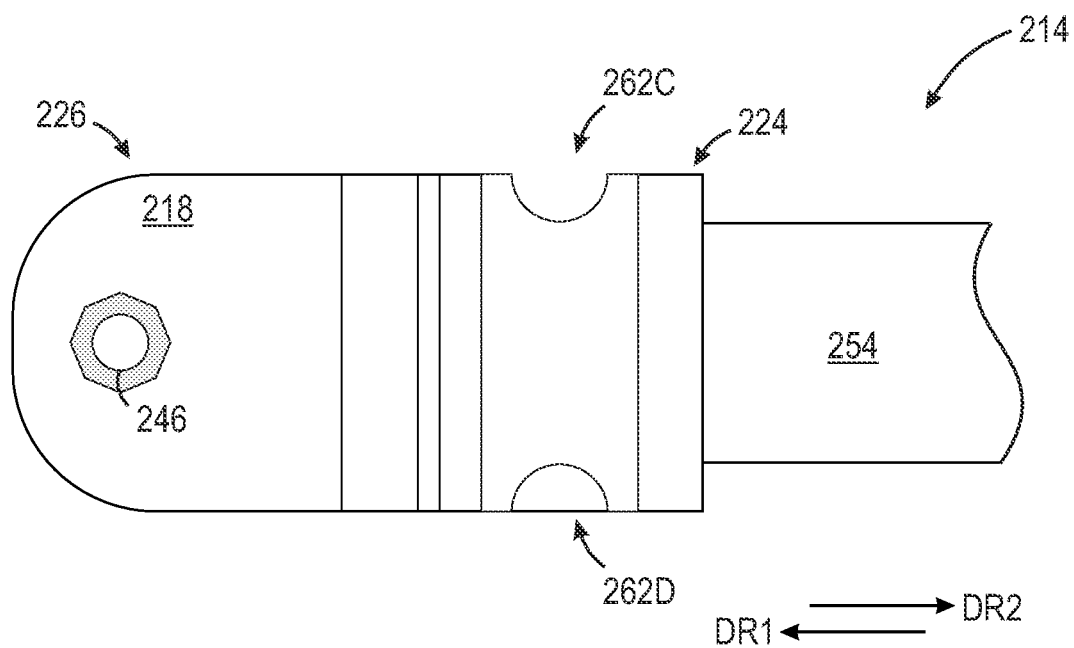
FIG. 11B is a bottom plan view of an engagement bracket portion of a handle assembly according to the present disclosure.

As shown in FIGS. 11A-11B, in one example, rather than a plurality of grooves 228, engagement portion 214 includes a plurality of notches 262 for pin 206 to engage with. FIGS. 11A and 11B illustrate a top plan view and a bottom plan view, respectively, of engagement portion 214 of handle assembly 200 according to the present disclosure. As shown in FIG. 11A, first arm 216 includes a plurality of notches 262A-262B. As shown, first notch 262A is positioned on first arm 216 of engagement bracket portion 214 and proximate first end 220 of first arm 216, i.e., proximate longitudinal member 252. Similarly, second notch 262B is positioned on the opposing side of first arm 216 with respect to first notch 262A and proximate first end 220 of first arm 216. As shown in FIG. 11B, second arm 218 includes a plurality of notches 262C-262D. As shown, third notch 262C is positioned on second arm 218 of engagement bracket portion 214 and proximate first end 224 of second arm 218, i.e., proximate longitudinal member 252. Similarly, fourth notch 262D is positioned on the opposing side of second arm 218 with respect to third notch 262C and proximate first end 224 of second arm 218. Each notch of the plurality of notches 262A-262D (collectively referred to herein as "notches 262" or "plurality of notches 262") is intended to be a semi-circular cut-out with a radius greater than or equal to the radius of the first end 248 and second end 250 of pin 206 and/or a radius greater than or equal to the radius of first pin shroud 266 and second pin shroud 268 (discussed below). As will be discussed below, during operation the first end 248 of pin 206 is configured to rest within and engage with either first notch 262A or second notch 262B, while second end 250 of pin 206 is configured to rest within and engage with either third notch 262C or fourth notch 262D.

Figure 12B:
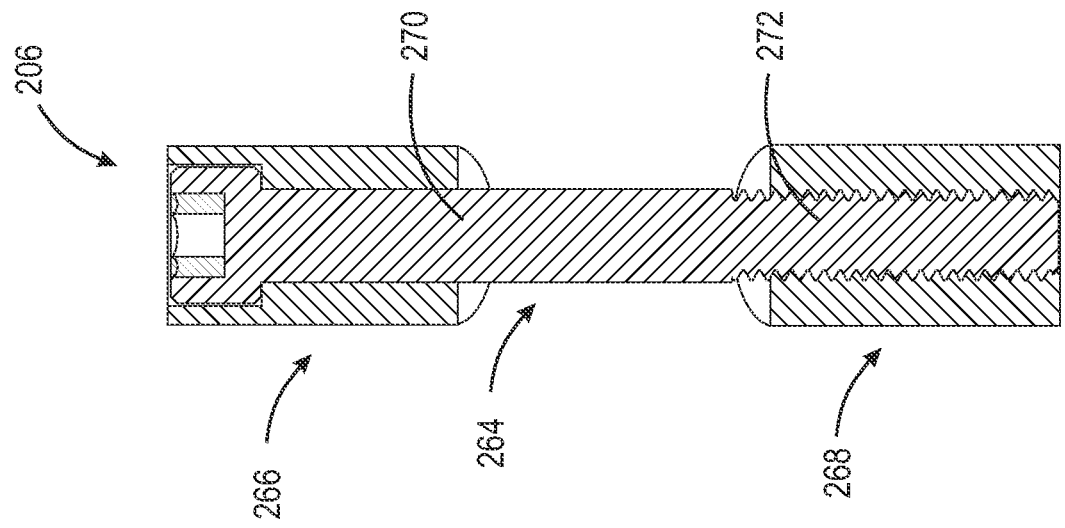
FIG. 12B is a cross-sectional assembled view of a pin taken generally down the center of the pin according to the present disclosure.
Figure 12A:
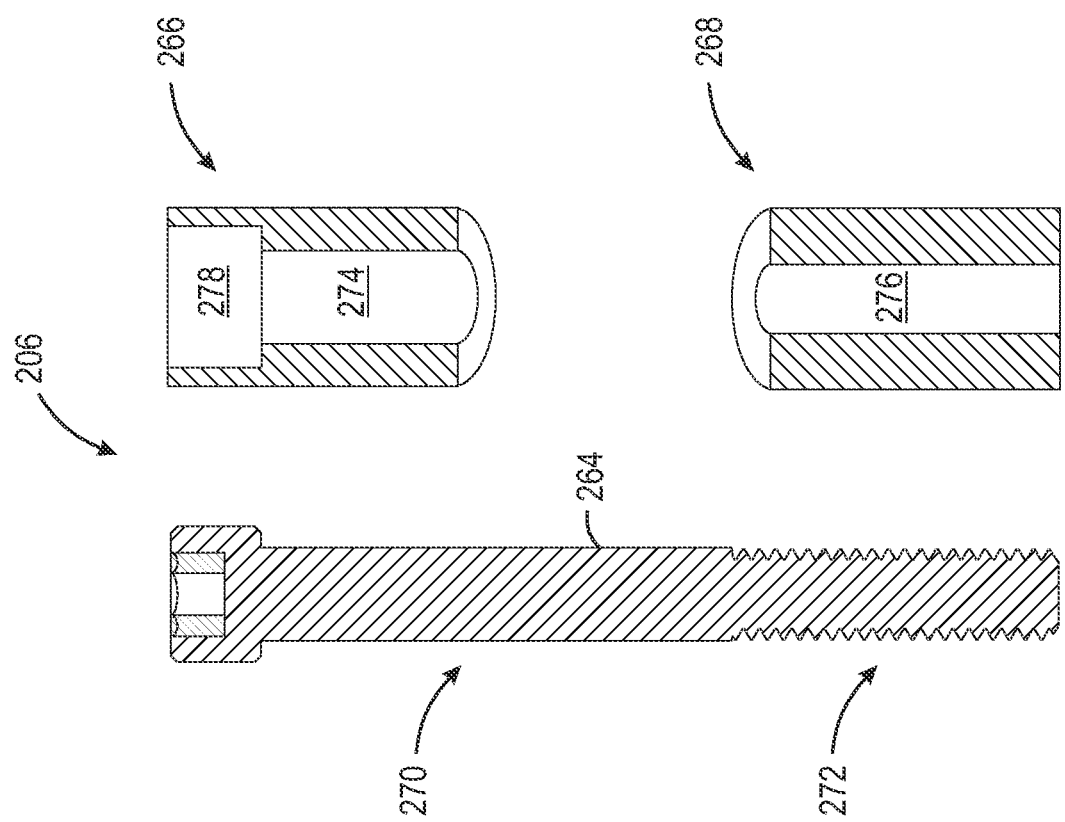
FIG. 12A is a cross-sectional exploded view of a pin taken generally down the center of the pin according to the present disclosure.

Additionally, as an alternative arrangement to the description and illustrations of pin 206 as shown in FIGS. 3 and 5-7 and described above, in other examples, as shown in FIGS. 12A-12B pin 206 can include a threaded bolt 264, a first pin shroud 266, and a second pin shroud 268. Threaded bolt 264 is a substantially longitudinal member configured to pass through the hole, aperture, or through-bore in the proximate end 118 of shift shaft 116. In some examples, threaded bolt 264 includes a non-threaded end 270 and a threaded end 272. As shown in FIGS. 12A and 12B, which illustrate an exploded view and an assembled view, respectively, of pin 206 according to the present disclosure, first pin shroud 266 includes a through-bore 274 and a cupped end where the through-bore 274 of the first pin shroud 266 is configured to receive and slidingly engage with the non-threaded end 270 of threaded bolt 264. Additionally, the cupped end of first pin shroud 266 has a radius that is configured to mirror the radius of and mate with the outer circumferential surface of the shift shaft 116. Similarly, second pin shroud 268 includes a through-bore 276 and a cupped end where the through-bore 276 of the second pin shroud 268 is configured to receive and slidingly engage with the threaded end 272 of threaded bolt 264. To that end, and although not illustrated, the inner surface of the through-bore 276 of the second pin shroud 268 can have a complementary threading to the threading on the threaded end 272 of threaded bolt 264. Additionally, the cupped end of second pin shroud 268 has a radius that is configured to mirror the radius of and mate with the outer circumferential surface of the shift shaft 116. Thus, during assembly, the first pin shroud 266 and the second pin shroud 268 are positioned such that the cupped end of first pin shroud 266 and the cupped end of second pin shroud 268 mate with the outer circumferential surface of shift shaft 116 and where each pin shroud is on opposing sides of the shift shaft 116. The operator of the trailer landing gear system 100 can then slide the threaded bolt 264 through the through-bore 274 of first pin shroud 266, through the hole, through-bore, or aperture in the proximate end 118 of shift shaft 116, and rotate the threaded bolt 264 to engage the threads of the threaded end 272 of threaded bolt 264 with the threading in the through-bore 276 of second pin shroud 268. As the threaded bolt 264 is rotated into the threading of the second pin shroud 268, the head of the threaded bolt 264 contacts the bottom flange of a well 278 within first pin shroud 266 pulling the first pin shroud 266 and the second pin shroud 268 together securing them about the shift shaft 116.

Figure 13:
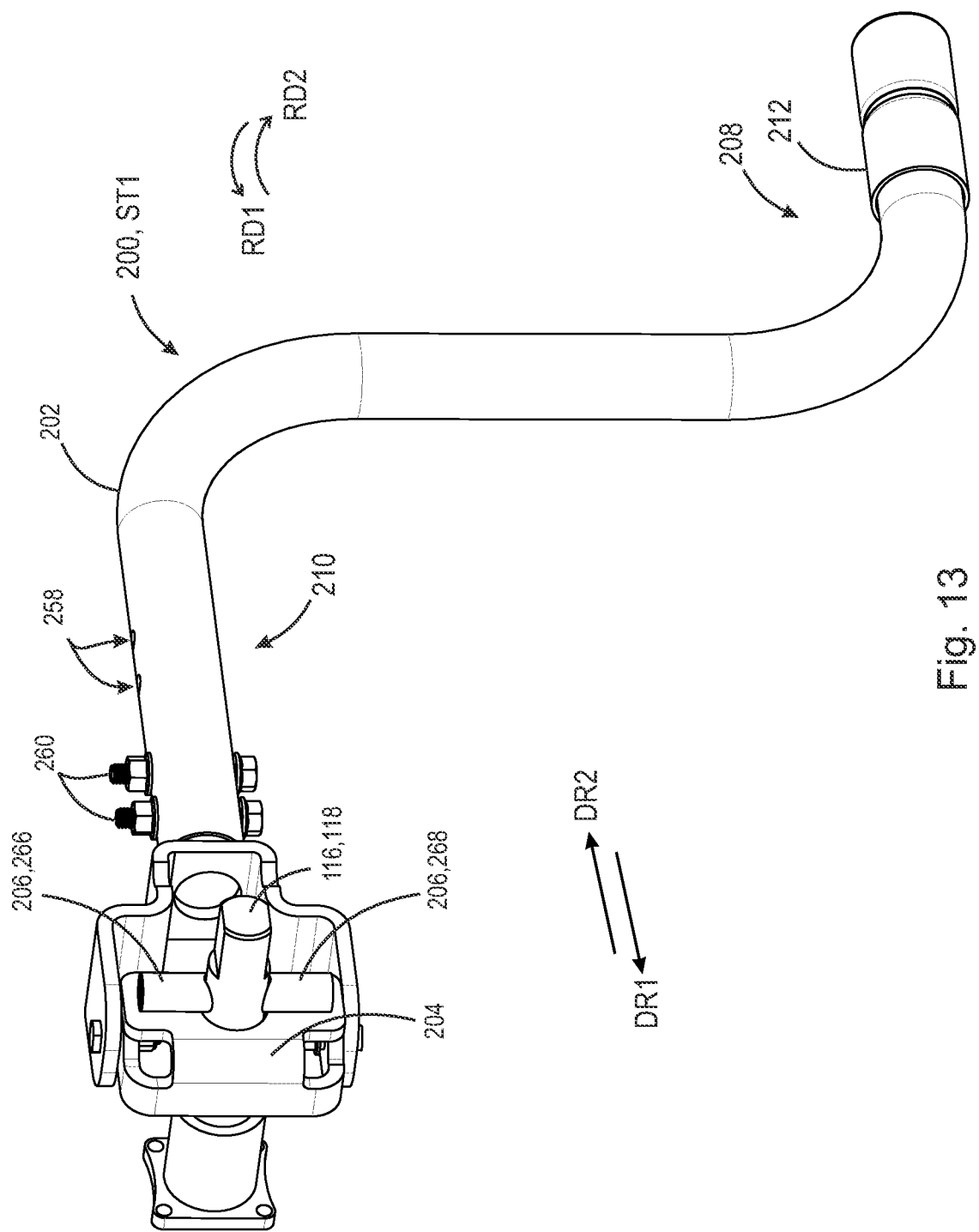
FIG. 13 is a perspective view of a handle assembly in a stowed state according to the present disclosure.

Thus, in an alternative operation of trailer landing gear system 100, it is desirable (at least in certain circumstances) to allow the operator to manually raise or lower the legs of the trailer landing gear system 100 using handle assembly 200. As shown in FIG. 13, which illustrates a front perspective view of handle assembly 200, while driving or transporting the trailer (not shown), the handle assembly 200 is arranged in a first state ST1 (hereinafter "first state ST1" or "stowed state ST1"), i.e., a state where handle 202 has been pivoted out of alignment with shift shaft 116 and has been stowed or otherwise affixed to a portion of the trailer or trailer landing gear system 100. It should be appreciated that, as described above, even during stowed state ST1 pivot bracket 204 remains disposed about shift shaft 116 via sliding engagement with through-bore 242 (shown in FIG.

7). Prior to raising or lowering the legs of the trailer landing gear system 100, the operator may desire to adjust or change the operating length of handle 202 with respect to the rest of the trailer landing gear system 100. For example, the trailer (not shown) may require a longer handle 202 such that rotation of the handle during operation can clear (i.e., not contact during rotation), the body of the trailer. To that end, the use may, using the handle assembly 200 of the present disclosure, telescopingly slide handle 202 about or with respect to the longitudinal member 254 of engagement bracket portion 214 until the handle 202 is in the desired operating length. Once set to the desired length, the operator can align first adjustment apertures 256 and second adjustment apertures 258 and lock the handle 202 in the desired length position by sliding at least one adjustment fastener 260 through the first adjustment apertures 256 and second adjustment apertures 258 such that the handle 202 is prevented from sliding or shifting along rotational axis RA with respect to longitudinal member 254 of engagement portion 214.

Figure 14:
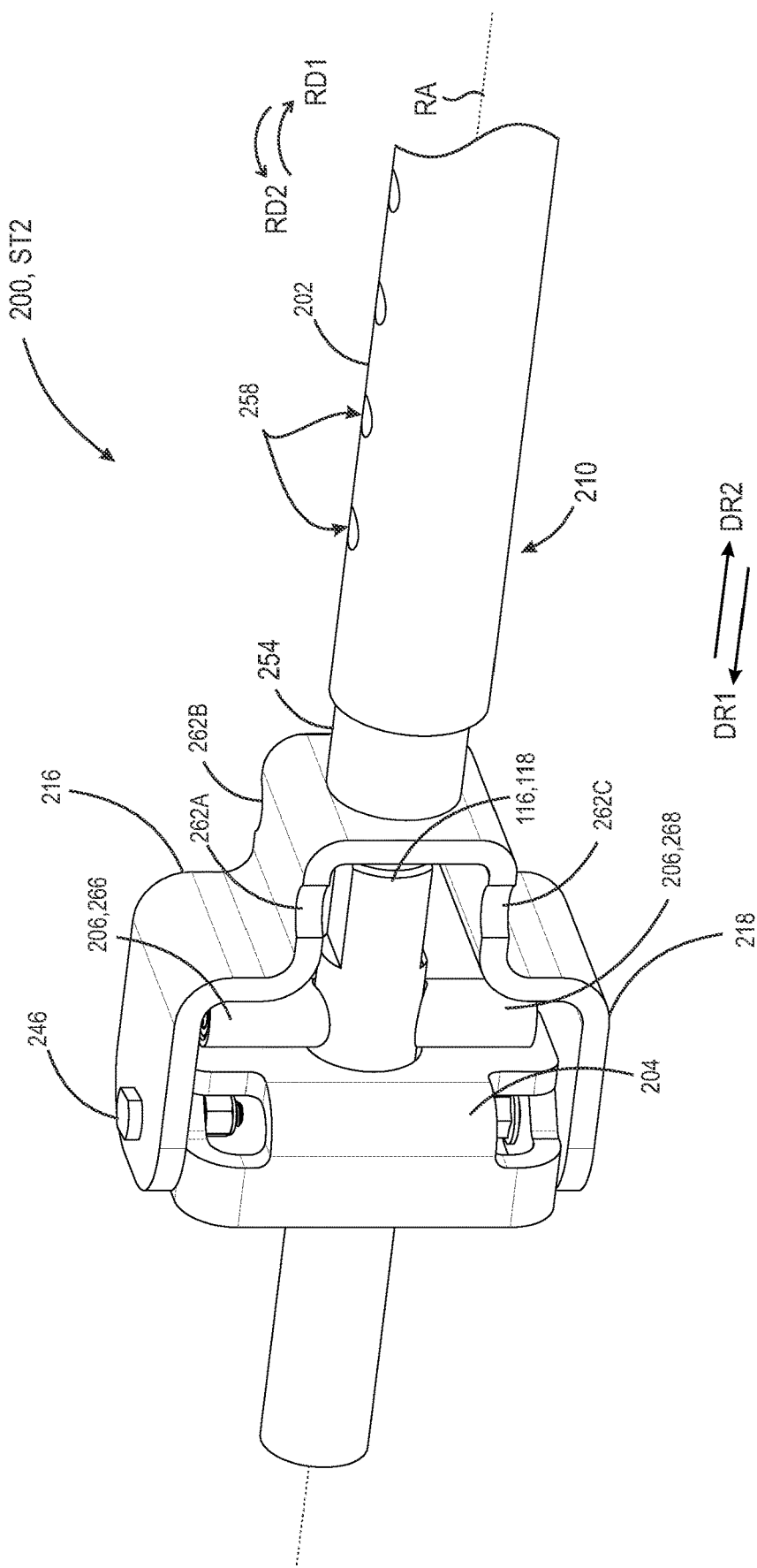
FIG. 14 is a perspective view of a handle assembly according to the present disclosure.
Figure 15:
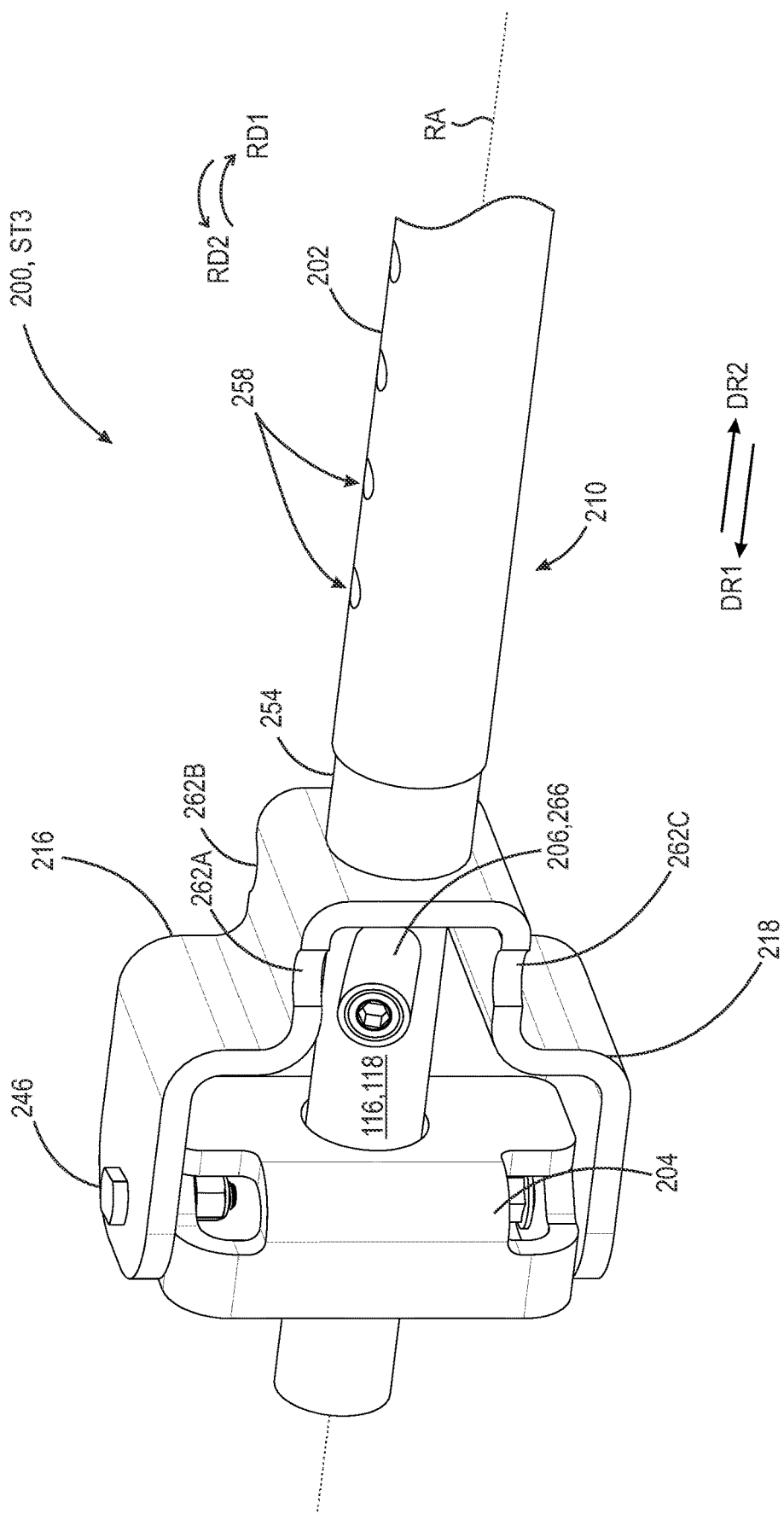
FIG. 15 is a perspective view of a handle assembly according to the present disclosure.
Figure 16:
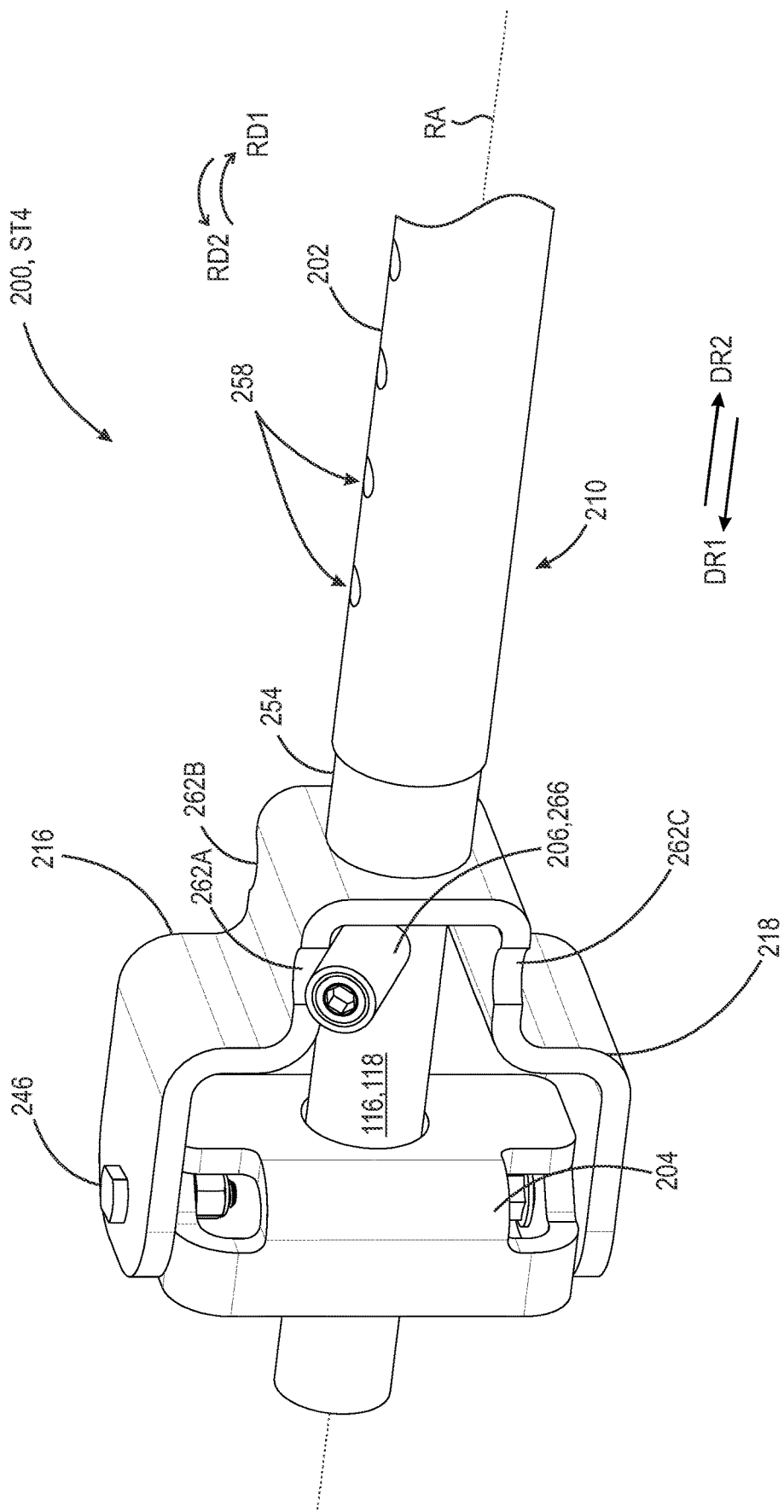
FIG. 16 is a perspective view of a handle assembly according to the present disclosure.

When the tractor operator desires to manually raise or lower the legs of trailer landing gear system 100, the operator can pivot handle 202 about connectors 246, i.e., about the connectors arranged to pivotably secure first arm 216 and second arm 218 of engagement bracket portion 214 with the respective tabs 244 of the first planar portion 238 of pivot bracket 204. By pivoting handle 202 to be in alignment with shift shaft 116, handle assembly 200 has been transitioned from the first, stowed state ST1 to a second state ST2. Second state ST2, shown by a partial magnified view of handle assembly 200 in FIG. 14, represents the state of handle assembly 200 where handle 202 is substantially aligned with or in line with shift shaft 116 and/or rotational axis RA, and where engagement bracket portion 214 is not engaged or slidingly engaged with pin 206. From the second state ST2, i.e., in an in line and disengaged position, the tractor operator can transition handle assembly 200 to a third state ST3 (shown in FIG. 15) by rotating handle 202 substantially 90 degrees in a rotational direction (e.g., first rotational direction, i.e., clockwise) and sliding handle 202 in a first direction DR1 along rotational axis RA until first pin shroud 266 and second pin shroud 268 are substantially aligned with first notch 262A and fourth notch 262D (shown in FIG. 11B).

From the third state ST3 (shown in FIG. 15), the tractor operator can then rotate handle 202 in a second rotational direction RD2 (e.g., counter-clockwise) to engage first pin shroud 266 and first notch 262A and engage second pin shroud 268 with fourth notch 262D. In this fourth state ST4 (shown in FIG. 16), i.e., where both pin shrouds are engaged with respective notches of engagement bracket portion 214, the operator can continue to rotate or crank handle 202 in the second rotational direction RD2 about rotational axis RA, which will transfer rotational torque from the handle 202 to each leg of the trailer landing gear system 100, via cross-shaft 106 and/or the one or more gears within each leg to, e.g., raise or lower the legs of the trailer landing gear system 100.

Alternatively, and although not shown, from the second state ST2 (shown in FIG. 14), the tractor operator can rotate handle 202 in a second rotational direction RD2 (e.g., counter-clockwise) while translating the handle along first direction DR1 until both pin shrouds are aligned with the notches of engagement bracket portion 214. Then from this alternative third state ST3, the operator can rotate handle 202 in the first rotational direction RD1 (e.g., clockwise) to engage first pin shroud 266 with second notch 262B and engage second pin shroud 268 with third notch 262C. Once in this alternative fourth state ST4, the operator can continue to rotate or crank handle 202 in the first rotational direction RD1 about rotational axis RA, which will transfer rotational torque from the handle 202 to each leg of the trailer landing gear system 100, via cross-shaft 106 and/or the one or more gears within each leg to, e.g., raise or lower the legs of the trailer landing gear system 100.

When the operator is satisfied with the current position of the legs of the trailer landing gear system 100, the operator can proceed through each state recited above in the reverse order so that the handle assembly 200 is placed in the stowed state, i.e., ST1 (shown in FIG. 13). For example, from the fourth state ST4 (shown in FIG. 16) the operator can rotate handle 202 such that first pin shroud 266 and second pin shroud 268 of pin 206 are disengaged with the notches of the engagement bracket portion 214 to transition handle assembly to the third state ST3 (shown in FIG. 15). From the third state ST3, the operator can pull handle 202 in second direction DR2, opposite first direction DR1, such that pin 206 is no longer aligned with the plurality of notches of the engagement bracket portion 214, placing handle assembly 200 in second state ST2 (shown in FIG. 14). From the second state ST2, the operator can pivot handle 202 about connectors 246 and out of alignment with shift shaft 116, to the stowed state ST1 (shown in FIG. 13), where handle 202 can be clamped or otherwise secured to a portion of the trailer landing gear system 100 and/or the trailer (not shown) for safe and secure storage during transportation.

Thus the present trailer landing gear system 100 and handle assembly 200 provide a pivotable handle 202 which is continuously connected to the shift shaft 116 via throughbore 242 of second planar portion 240 of pivot bracket 204 such that the handle 202 is always located proximate the shift shaft 116 and is ready to be pivoted into an engaged position (e.g., second state ST2, third state ST3, and fourth state ST4) quickly and efficiently. Additionally, the handle 202 can be pivoted away and stowed (e.g., in stowed state ST1) such that there is no interference between the stowed handle 202 and the rotating shift shaft 116 during transportation of a tractor trailer.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A handle assembly, comprising:
a handle comprising a first end and a second end, the first end having a grip portion and the second end arranged proximate to an engagement bracket portion, the engagement bracket portion comprising a plurality of grooves;
a pivot bracket pivotably secured to the engagement bracket portion, the pivot bracket comprising a through-bore arranged to receive a shift shaft of a trailer landing gear assembly, such that the pivot bracket is arranged about the shift shaft; and
a pin secured to a proximate end of the shift shaft, the shift shaft having an imaginary rotational axis;
wherein the plurality of grooves are arranged to engage with the pin such that rotation of the handle about the imaginary rotational axis in a first rotational direction generates a rotational motion of the shift shaft in the first rotational direction;
wherein the handle comprises the plurality of grooves and the pin includes a first end and a second end, the first end arranged to engage with a first groove of the plurality of grooves and the second end arranged to engage with a second groove of the plurality of grooves;
wherein the engagement bracket portion of the handle further comprises a first arm and a second arm, the first arm comprising the first groove and the second arm comprising the second groove; and
wherein the first arm has a first end and a second end and wherein the first groove is stepped or sloped between the first end and the second end of the first arm.

2. The handle assembly of claim 1, wherein, in a first state, the plurality of grooves are arranged to engage with the pin such that the rotation of the handle about the imaginary rotational axis in the first rotational direction generates the rotational motion of the shift shaft in the first rotational direction; and, in a second state, the handle is configured to pivot about the pivot bracket to a stowed state.

3. The handle assembly of claim 2, wherein, in at least the second state, the handle is configured to pivot about the pivot bracket, while the pivot bracket remains arranged about the shift shaft.

4. The handle assembly of claim 1, wherein the engagement bracket portion includes a longitudinal member arranged to telescopingly engage with the second end of the handle, and wherein the longitudinal member includes a first plurality of adjustment apertures that are configured to align with a second plurality of adjustment apertures on the second end of the handle.

5. The handle assembly of claim 1, wherein the handle comprises the plurality of grooves and each of the plurality of grooves includes a translational groove portion and an expanded groove portion, the expanded groove portion arranged to engage with the pin.

6. The handle assembly of claim 1, wherein the second arm has a first end and a second end and wherein the second groove is stepped or sloped between the first end and the second end of the second arm.

7. The handle assembly of claim 1, wherein the engagement bracket portion of the handle further comprises a spring pin arranged between the first arm and the second arm.

8. A trailer landing gear system, comprising:
a first landing gear leg rotationally engaged with a cross-shaft of a landing gear assembly;
a shift shaft connected to the first landing gear leg; and
a handle assembly comprising:
a handle comprising a first end and a second end, the first end having a grip portion and the second end arranged proximate to an engagement bracket portion, the engagement bracket portion comprising a plurality of grooves;

a pivot bracket pivotably secured to the engagement bracket portion, the pivot bracket comprising a through-bore arranged to receive the shift shaft of the trailer landing gear assembly, such that the pivot bracket is arranged about the shift shaft; and a pin secured to a proximate end of the shift shaft, the shift shaft having an imaginary rotational axis;

wherein the plurality of grooves are arranged to engage with the pin such that rotation of the handle about the imaginary rotational axis in a first rotational direction generates a rotational motion of the shift shaft in the first rotational direction;

wherein the pin comprises a first end and a second end, the first end arranged to engage with a first groove of the plurality of grooves and the second end arranged to engage with a second groove of the plurality of grooves;

wherein the engagement bracket portion of the handle further comprises a first arm and a second arm, the first arm comprising the first groove and the second arm comprising the second groove; and wherein the first arm has a first end and a second end and wherein the first groove is stepped or sloped between the first end and the second end of the first arm.

9. The trailer landing gear system of claim 8, wherein, in a first state, the plurality of grooves are arranged to engage with the pin such that the rotation of the handle about the imaginary rotational axis in the first rotational direction generates the rotational motion of the shift shaft in the first rotational direction; and, in a second state, the handle is configured to pivot about the pivot bracket to a stowed state.

10. The trailer landing gear system of claim 9, wherein, in at least the second state, the handle is configured to pivot about the pivot bracket, while the pivot bracket remains arranged about the shift shaft.

11. The trailer landing gear system of claim 8, wherein the plurality of grooves each include a translational groove portion and an expanded groove portion, the expanded groove portion arranged to engage with the pin.

12. The trailer landing gear system of claim 8, wherein the second arm has a first end and a second end and wherein the second groove is stepped or sloped between the first end and the second end of the second arm.

\* \* \* \* \*